US010497096B2

(12) United States Patent
Nguyen et al.

(10) Patent No.: US 10,497,096 B2
(45) Date of Patent: Dec. 3, 2019

(54) DETERMINATION OF A DISPLAY ANGLE OF A DISPLAY

(71) Applicant: Nokia Technologies Oy, Espoo (FI)

(72) Inventors: David Nguyen, Santa Clara, CA (US); Shigeyuki Seko, Campbell, CA (US); Kenton Lyons, Santa Clara, CA (US); Seung Wook Kim, Cupertino, CA (US); Audrey Desjardins, Vancouver (CA)

(73) Assignee: NOKIA TECHNOLOGIES OY, Espoo (FI)

( * ) Notice: Subject to any disclaimer, the term of this patent is extended or adjusted under 35 U.S.C. 154(b) by 87 days.

(21) Appl. No.: 14/914,165

(22) PCT Filed: Sep. 16, 2014

(86) PCT No.: PCT/US2014/055962
§ 371 (c)(1),
(2) Date: Feb. 24, 2016

(87) PCT Pub. No.: WO2015/042075
PCT Pub. Date: Mar. 26, 2015

(65) Prior Publication Data
US 2016/0217554 A1   Jul. 28, 2016

Related U.S. Application Data

(60) Provisional application No. 61/879,063, filed on Sep. 17, 2013.

(51) Int. Cl.
*G06T 3/60* (2006.01)
*G06F 3/0487* (2013.01)
(Continued)

(52) U.S. Cl.
CPC ............... *G06T 3/60* (2013.01); *G06F 1/163* (2013.01); *G06F 1/1626* (2013.01);
(Continued)

(58) Field of Classification Search
CPC ............... G06T 3/60; G06F 2200/1614; G06F 2200/1637
See application file for complete search history.

(56) References Cited

U.S. PATENT DOCUMENTS 6,115,025 A    9/2000  Buxton et al.
8,209,635 B2   6/2012  Thom
(Continued)

FOREIGN PATENT DOCUMENTS

CN    101291352 A    10/2008
CN    101387940 A    3/2009
(Continued)

OTHER PUBLICATIONS

Tilt and Scroll Display for Mobile Devices, "Tilt-and-Scroll" Technology for Smartphones and Other Handheld Devices, Oct. 27, 2011, Internet Archive, RotoView by Innoventions, Inc., pp. 1-3. (Year: 2011).*
(Continued)

*Primary Examiner* — Jeffery A Brier
(74) *Attorney, Agent, or Firm* — Alston & Bird LLP

(57) ABSTRACT

A method comprising determining a first display angle of a display comprised by an apparatus with respect to gravity, determining a first contiguous subset of a sequential arrangement of information based, at least in part, on the first display angle, performing a first operation based, at least in part, on the first contiguous subset, determining a second display angle of the display with respect to gravity, the second display angle being different from the first display angle, determining a second contiguous subset of the
(Continued)

sequential arrangement based, at least in part, on the second display angle, and performing a second operation based, at least in part, on the second contiguous subset is disclosed.

20 Claims, 15 Drawing Sheets

(51) Int. Cl.
| | |
|---|---|
| *G06F 1/16* | (2006.01) |
| *G06F 3/01* | (2006.01) |
| *G09G 5/30* | (2006.01) |
| *G06F 3/0482* | (2013.01) |
| *G06F 3/0346* | (2013.01) |
| *G06F 3/041* | (2006.01) |
| *G06F 3/0481* | (2013.01) |
| *G06F 3/0484* | (2013.01) |
| *G06F 3/14* | (2006.01) |
| *G09G 5/391* | (2006.01) |

(52) U.S. Cl.
CPC .......... *G06F 1/1637* (2013.01); *G06F 1/1684* (2013.01); *G06F 1/1694* (2013.01); *G06F 3/013* (2013.01); *G06F 3/017* (2013.01); *G06F 3/0346* (2013.01); *G06F 3/041* (2013.01); *G06F 3/0481* (2013.01); *G06F 3/0482* (2013.01); *G06F 3/0487* (2013.01); *G06F 3/04845* (2013.01); *G06F 3/14* (2013.01); *G09G 5/30* (2013.01); *G09G 5/391* (2013.01); *G06F 2200/1637* (2013.01); *G09G 2320/02* (2013.01); *G09G 2320/06* (2013.01); *G09G 2320/0626* (2013.01); *G09G 2340/14* (2013.01); *G09G 2354/00* (2013.01)

(56) References Cited

U.S. PATENT DOCUMENTS

| | | | |
|---|---|---|---|
| 8,289,162 B2 | 10/2012 | Mooring et al. | |
| 8,351,773 B2 | 1/2013 | Nasiri et al. | |
| 8,750,565 B2 | 6/2014 | Wu | |
| 9,318,143 B2 | 4/2016 | Pai | |
| 9,417,666 B2 | 8/2016 | Abraham et al. | |
| 9,582,851 B2 | 2/2017 | Raman | |
| 2002/0080132 A1 | 6/2002 | Dai et al. | |
| 2002/0158812 A1 | 10/2002 | Pallakoff | |
| 2004/0201595 A1* | 10/2004 | Manchester ......... G06F 1/1626 345/649 |
| 2007/0004451 A1* | 1/2007 | C. Anderson ........ G06F 1/1626 455/556.1 |
| 2007/0136064 A1* | 6/2007 | Carroll ................ G06F 1/1613 704/254 |
| 2008/0045207 A1* | 2/2008 | Ahn .................... H04M 1/7258 455/428 |
| 2008/0259094 A1* | 10/2008 | Kim .................... G06F 1/1626 345/651 |
| 2009/0007006 A1 | 1/2009 | Liu et al. | |
| 2009/0066637 A1 | 3/2009 | McCall | |
| 2009/0164896 A1 | 6/2009 | Thorn | |
| 2010/0064259 A1* | 3/2010 | Alexanderovitc .... G06F 1/1626 715/852 |
| 2010/0079508 A1 | 4/2010 | Hodge et al. | |
| 2010/0088061 A1 | 4/2010 | Horodezky et al. | |
| 2010/0125816 A1 | 5/2010 | Bezos | |
| 2011/0074671 A1 | 3/2011 | Shimosato et al. | |
| 2011/0156869 A1 | 6/2011 | Walt | |
| 2011/0163955 A1 | 7/2011 | Nasiri et al. | |
| 2011/0316888 A1 | 12/2011 | Sachs et al. | |
| 2012/0038675 A1 | 2/2012 | Johnson et al. | |
| 2012/0233059 A1 | 9/2012 | Buck | |
| 2012/0235790 A1 | 9/2012 | Zhao et al. | |
| 2013/0002541 A1 | 1/2013 | Kanehira | |
| 2013/0033485 A1 | 2/2013 | Kollin et al. | |
| 2013/0042209 A1 | 2/2013 | Leon et al. | |
| 2013/0135196 A1 | 5/2013 | Park et al. | |
| 2013/0222271 A1 | 8/2013 | Alberth et al. | |
| 2013/0342569 A1 | 12/2013 | Karkkainen et al. | |
| 2014/0009499 A1* | 1/2014 | Gardenfors ............ G09G 5/363 345/656 |
| 2014/0132508 A1 | 5/2014 | Hodge et al. | |
| 2014/0152559 A1* | 6/2014 | Chen .................... G06F 1/1626 345/157 |
| 2014/0313119 A1 | 10/2014 | Cho et al. | |
| 2014/0361971 A1 | 12/2014 | Sala | |
| 2014/0369525 A1* | 12/2014 | Lin ...................... H03G 3/3089 381/107 |
| 2015/0024678 A1* | 1/2015 | Chang ................. H04W 76/023 455/39 |
| 2015/0042554 A1* | 2/2015 | Chen ...................... G06F 3/011 345/156 |
| 2015/0097773 A1* | 4/2015 | Liao ...................... G06F 3/0487 345/158 |
| 2015/0116601 A1* | 4/2015 | Wang .................... H04N 5/7408 348/744 |
| 2016/0195925 A1 | 7/2016 | Nguyen et al. | |
| 2016/0217554 A1 | 7/2016 | Nguyen et al. | |

FOREIGN PATENT DOCUMENTS

| | | |
|---|---|---|
| CN | 102047318 A | 5/2011 |
| CN | 103135762 A | 6/2011 |
| CN | 102160017 A | 8/2011 |
| CN | 102239460 A | 11/2011 |
| CN | 102334326 A | 1/2012 |
| CN | 102376295 A | 3/2012 |
| CN | 102804258 A | 11/2012 |
| CN | 102821199 A | 12/2012 |
| EP | 1143326 | 10/2001 |
| JP | 2005-348000 | 12/2005 |
| JP | 2006-155268 | 6/2006 |
| JP | 2006-243784 | 9/2006 |
| JP | 2006-320738 | 11/2006 |
| JP | 2008-011035 | 1/2008 |
| JP | 2008-217444 | 9/2008 |
| JP | 2011-510364 | 3/2011 |
| JP | 2012-509544 | 4/2012 |
| JP | 2013-114691 | 6/2013 |
| WO | 2001/043473 A1 | 6/2001 |
| WO | 2009/045279 A2 | 4/2009 |
| WO | WO 2013/081598 | 6/2013 |
| WO | WO-2013/099128 A1 * | 7/2013 |
| WO | 2013162564 | 10/2013 |
| WO | 2014142382 | 9/2014 |

OTHER PUBLICATIONS

"The SnackBox: A Handheld Near-Eye Display", Draft version, CHI, 2014, pp. 1-8.
Lyons et al., "Loupe: A Handheld Near-Eye Display", Proceedings of the 27th annual ACM symposium on User interface software and technology, Oct. 5-8, 2014, pp. 351-354.
Gupta et al., "Gesture Pendant II", Research Paper, Oct. 1, 2006, pp. 1-5.
Extended European Search Report received for corresponding European Patent Application No. 14846378.9, dated Apr. 12, 2017, 8 pages.
International Search Report and Written Opinion received for corresponding Patent Cooperation Treaty Application No. PCT/US2014/055962, dated Dec. 31, 2014, 12 pages.
Extended European Search Report received for corresponding European Patent Application No. 14845472.1, dated Apr. 12, 2017, 8 pages.
International Search Report and Written Opinion for corresponding Application No. PCT/US2014/055959 dated Dec. 22, 2014, 15 pages.
International Search Report and Written Opinion for corresponding Application No. PCT/US2014/055829, dated Jan. 13, 2015, 6 pages.

(56) References Cited

OTHER PUBLICATIONS

Office Action for U.S. Appl. No. 14/914,800 dated Jan. 30, 2017, 9 pages.
Office Action for U.S. Appl. No. 14/914,800 dated Jul. 6, 2017, 13 pages.
Office Action for U.S. Appl. No. 14/915,733 dated Sep. 8, 2017, 8 pages.
Office action received for corresponding Japanese Patent Application No. 2016-543957, dated Apr. 25, 2017, 4 pages of office action and 7 pages of translation available.
Office action received for corresponding Saudi Arab Patent Application No. 516370712, dated Oct. 4, 2016, 1 pages of office action and no pages of translation available.
Supplementary European Search Report for Application No. EP 14 84 6714.5 dated Apr. 13, 2017, 8 pages.
Office Action from Japanese Patent Application No. 2016-543957, dated Oct. 17, 2017, 6 pages.
Notice of Allowance for U.S. Appl. No. 14/914,800 dated Dec. 6, 2017.
Office Action for Chinese Application No. 201480059542.4 dated Mar. 16, 2018, 11 pages.
Office Action for Chinese Application No. 2014800510040 dated Jan. 23, 2018, 15 pages.
Office Action for Chinese Application No. 201480051152.2 dated Feb. 5, 2018, 10 pages.
Office Action for Philippines Patent Application No. 1-2016-500510 dated Mar. 15, 2018, 3 pages.
Office Action for Chinese Application No. 2014800510040 dated Sep. 19, 2018, 12 pages.
Office Action for Saudi Arabian No. (1)516370712 dated Mar. 19, 2018, 8 pages.
Notice of Allowance for U.S. Appl. No. 14/915,733, dated May 22, 2018.
Office Action for Chinese Application No. 201480059542.4 dated Nov. 16, 2018, 6 pages.
Office Action for Philippines Parent Application No. 1-2016-500510 dated Apr. 2, 2019, 4 pages.
Office Action for Australian Application No. 2014321416 dated Apr. 4, 2019, 3 pages.
Office Action for Philippine Application No. 1/2016/500510 dated Jul. 15, 2019.
Office Action for U.S. Appl. No. 15/980,338 dated Jul. 10, 2019.

\* cited by examiner

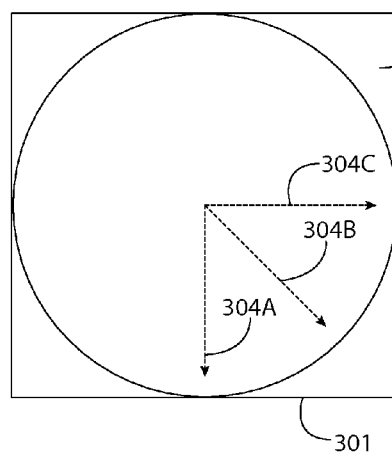
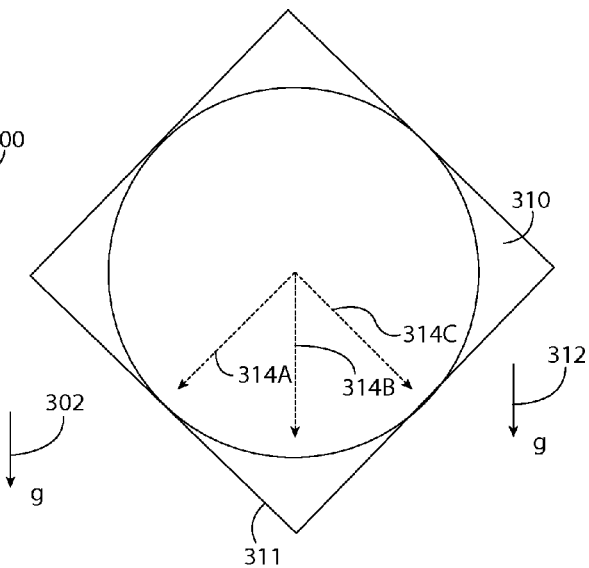
FIG. 3A          FIG. 3B
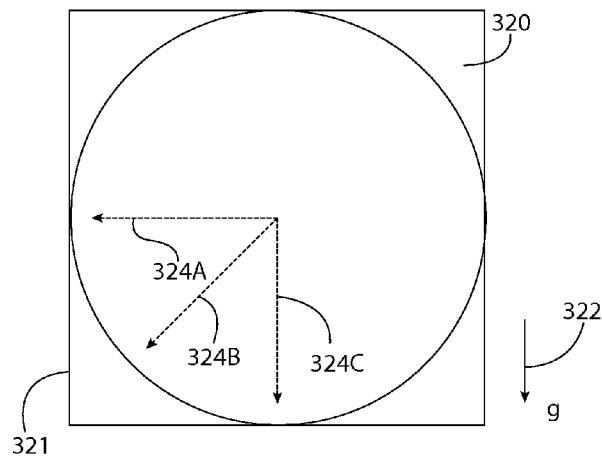
FIG. 3C

DETERMINATION OF A DISPLAY ANGLE OF A DISPLAY

RELATED APPLICATION

This application was originally filed as PCT Application No. PCT/US2014/055962 filed Sep. 16, 2014 and claiming priority benefit from U.S. Provisional Application No. 61/879,063, filed Sep. 17, 2013.

TECHNICAL FIELD

The present application relates generally to determination of a display angle of a display.

BACKGROUND

In recent times, electronic apparatuses have become increasingly pervasive in our society. In many circumstances, a user may often view and/or interact with information displayed by an electronic apparatuses and/or electronic apparatus peripherals in performance of various activities, in various contexts, and/or the like. As such, it may be desirable to configure an apparatus such that a user of the apparatus may view and/or interact with information displayed by the apparatus in an easy and intuitive manner.

SUMMARY

Various aspects of examples of the invention are set out in the claims.

One or more embodiments may provide an apparatus, a computer readable medium, a non-transitory computer readable medium, a computer program product, and a method for determining a first display angle of a display comprised by an apparatus with respect to gravity, determining a first contiguous subset of a sequential arrangement of information based, at least in part, on the first display angle, performing a first operation based, at least in part, on the first contiguous subset, determining a second display angle of the display with respect to gravity, the second display angle being different from the first display angle, determining a second contiguous subset of the sequential arrangement based, at least in part, on the second display angle, and performing a second operation based, at least in part, on the second contiguous subset.

One or more embodiments may provide an apparatus, a computer readable medium, a computer program product, and a non-transitory computer readable medium having means for determining a first display angle of a display comprised by an apparatus with respect to gravity, means for determining a first contiguous subset of a sequential arrangement of information based, at least in part, on the first display angle, means for performing a first operation based, at least in part, on the first contiguous subset, means for determining a second display angle of the display with respect to gravity, the second display angle being different from the first display angle, means for determining a second contiguous subset of the sequential arrangement based, at least in part, on the second display angle, and means for performing a second operation based, at least in part, on the second contiguous subset.

In at least one example embodiment, the first operation is different from the second operation.

In at least one example embodiment, the first contiguous subset is different from the second contiguous subset.

In at least one example embodiment, the first contiguous subset comprises a portion of the second contiguous subset, the portion being less than an entirety of the second contiguous subset.

In at least one example embodiment, the determination of the first display angle with respect to gravity comprises receipt of sensor information that indicates a direction of gravity, and determination of the first display angle based, at least in part, on the direction of gravity in relation to the display.

In at least one example embodiment, the determination of the first display angle based, at least in part, on the direction of gravity in relation to the display comprises determination that the direction of gravity differs from a predetermined reference angle by the first display angle.

In at least one example embodiment, the predetermined reference angle corresponds with an angle that is perpendicular to a bottom of the display.

In at least one example embodiment, the determination of the second contiguous subset comprises determination of an angular change between the first display angle and the second display angle, and determination of the second contiguous subset based, at least in part, on the angular change and the first contiguous subset.

In at least one example embodiment, the first contiguous subset corresponds with a first position within the sequential arrangement of information, and the determination of the second contiguous subset based, at least in part, on the angular change and the first contiguous subset comprises determination of a magnitude of the angular change, determination of a second position within the sequential arrangement of information based, at least in part, on the first position and the magnitude of the angular change, and determination of the second contiguous subset such that the second contiguous subset corresponds with the second position within the sequential arrangement of information.

In at least one example embodiment, a difference between the first position and the second position is proportional to the magnitude of the angular change.

In at least one example embodiment, the determination of the second position within the sequential arrangement of information based, at least in part, on the first position and the magnitude of the angular change comprises determination of a direction of the angular change, and determination of the second position within the sequential arrangement of information based, at least in part, on the first position, the magnitude of the angular change, and the direction of the angular change.

In at least one example embodiment, a positional direction from the first position to the second position corresponds with the direction of the angular change.

In at least one example embodiment, an incremental positional direction corresponds with a clockwise direction of the angular change and a decremental positional direction corresponds with a counter-clockwise direction of the angular change.

In at least one example embodiment, an incremental positional direction corresponds with a counter-clockwise direction of the angular change and a decremental positional direction corresponds with a clockwise direction of the angular change.

In at least one example embodiment, the sequential arrangement of information is a virtual screen of information, the first contiguous subset is a first region of the virtual screen, the second contiguous subset is a second region of the virtual screen, the first operation comprises display of the first region of the virtual screen on the display, and the second operation comprises display of the second region of the virtual screen on the display.

In at least one example embodiment, the second operation further comprises termination of display of the first region of the virtual screen prior to the display of the second region of the virtual screen.

In at least one example embodiment, the display of the first region of the virtual screen is performed such that the orientation of the first region of the virtual screen on the display corresponds with the first display angle, and the display of the second region of the virtual screen is performed such that the orientation of the second region of the virtual screen on the display corresponds with the second display angle.

In at least one example embodiment, the sequential arrangement of information is an array of array elements, the first contiguous subset is a first array element of the array, the second contiguous subset is a second array element of the array, the first operation comprises selection of the first array element, and the second operation comprises selection of the second array element.

In at least one example embodiment, the first operation comprises display of an indication of the selection of the first array element such that the orientation of the indication of the selection of the first array element on the display corresponds with the first display angle, and the second operation comprises display of an indication of the selection of the second array element such that the orientation of the indication of the selection of the second array element on the display corresponds with the second display angle.

One or more example embodiments further perform display of a plurality of representations of array elements of the array of array elements.

In at least one example embodiment, the plurality of representations of array elements of the array of array elements comprises a representation of the first array element.

In at least one example embodiment, the plurality of representations of array elements of the array of array elements comprises a representation of the second array element.

In at least one example embodiment, an indication of a selection is an indication that indicates selection of a particular array element of the array of array elements.

In at least one example embodiment, an indication of a selection of an array element is at least one of highlighting of a representation of the array element, outlining of a representation of the array element, enlarging of a representation of the array element, or moving of a representation of the array element.

In at least one example embodiment, the array is an array of menu items, the first array element is a first menu item, and the second array element is a second menu item.

One or more example embodiments further perform display of a plurality of representations of array elements such that a representation of the first array element is displayed at a position that corresponds with the first display angle and a representation of the second array element is displayed at a position that corresponds with the second display angle.

In at least one example embodiment, the position that corresponds with the first display angle is a position along an axis that extends from a center of the display along the first display angle.

In at least one example embodiment, the position that corresponds with the first display angle is proximate to an outer edge of the display.

In at least one example embodiment, the first operation comprises modification of orientation of the plurality of representations of array elements such that an orientation of each representation of the plurality of representations on the display corresponds with the first display angle, and the second operation comprises modification of the orientation of the plurality of representations of array elements such that the orientation of each representation of the plurality of representations on the display corresponds with the second display angle.

In at least one example embodiment, the first operation comprises display, in a center portion of the display, of a representation of additional information such that the orientation of the representation of the additional information corresponds with the first display angle.

In at least one example embodiment, the second operation comprises display, in a center portion of the display, of a representation of additional information such that the orientation of the representation of the additional information corresponds with the second display angle.

In at least one example embodiment, the array is an array of program identifiers, the first array element is a first program identifier, the second array element is a second program identifier, the first operation comprises invocation of a first program identified by the first program identifier, and the second operation comprises invocation of a second program identified by the second program identifier.

In at least one example embodiment, the first operation comprises display, in a center portion of the display, of visual information that is caused to be displayed by the first program such that the orientation of the representation of the visual information that is caused to be displayed by the first program corresponds with the first display angle.

In at least one example embodiment, the second operation comprises display, in a center portion of the display, of visual information that is caused to be displayed by the second program such that the orientation of the representation of the visual information that is caused to be displayed by the second program corresponds with the second display angle.

In at least one example embodiment, the second operation comprises preclusion of display of visual information by the first program.

One or more example embodiments further perform receipt of environmental sensor information, and determination that the environmental sensor information indicates that the apparatus is actively viewed by a user, wherein the determination of the first display angle is predicated by the determination that the environmental sensor information indicates that the apparatus is actively viewed by the user.

In at least one example embodiment, the determination that the environmental sensor information indicates that the apparatus is actively viewed by a user comprises at least one of determination that an orientation of the apparatus indicates that the apparatus is actively viewed by the user, determination that an eye of the user is proximate to the display, or determination that the user is holding the apparatus.

In at least one example embodiment, the environmental sensor information comprises information indicative of a direction of gravity in relation to the apparatus, and the determination that the environmental sensor information indicates that the apparatus is actively viewed by the user comprises determination that an orientation of the apparatus indicates that the apparatus is actively viewed by the user based, at least in part, on the information indicative of the direction of gravity.

In at least one example embodiment, a direction of gravity that is substantially parallel to a surface of the display indicates that the apparatus is actively viewed by the user.

In at least one example embodiment, the direction of gravity is substantially parallel to the surface of the display in circumstances where the direction of gravity deviates from being exactly parallel to the surface of the display within a predetermined threshold angle.

In at least one example embodiment, the environmental sensor information comprises proximity sensor information that indicates proximity of the user in relation to the display, and the determination that the environmental sensor information indicates that the apparatus is actively viewed by a user comprises determination that an eye of the user is proximate to the display based, at least in part, on the proximity sensor information.

In at least one example embodiment, the proximity sensor information indicates an object being within a threshold distance from the display indicates proximity of the user.

In at least one example embodiment, the environmental sensor information comprises touch sensor information indicative of a user holding the apparatus, and the determination that the environmental sensor information indicates that the apparatus is actively viewed by a user comprises determination that the user is holding the apparatus based, at least in part, on the touch sensor information.

One or more example embodiments further perform receipt of different environmental sensor information, determination that the different environmental sensor information indicates that the apparatus is not actively viewed by the user, and preclusion of determination of a third display angle based, at least in part, on the determination that the different environmental sensor information indicates that the apparatus is not actively viewed by the user.

In at least one example embodiment, the determination that the different environmental sensor information indicates that the apparatus is not actively viewed by a user comprises at least one of determination that an orientation of the apparatus indicates that the apparatus is not actively viewed by the user, determination that an eye of the user is distant to the display, or determination that the user is not holding the apparatus.

In at least one example embodiment, the different environmental sensor information comprises information indicative of a direction of gravity in relation to the apparatus, and the determination that the different environmental sensor information indicates that the apparatus is not actively viewed by the user comprises determination that an orientation of the apparatus indicates that the apparatus is not actively viewed by the user based, at least in part, on the information indicative of the direction of gravity.

In at least one example embodiment, a direction of gravity substantially perpendicular to a surface of the display indicates that the apparatus is not actively viewed by the user.

In at least one example embodiment, the direction of gravity is substantially perpendicular to the surface of the display in circumstances where the direction of gravity deviates from being exactly perpendicular to the surface of the display within a predetermined threshold angle.

In at least one example embodiment, the different environmental sensor information comprises proximity sensor information that indicates absence of the user proximate to the display, and the determination that the different environmental sensor information indicates that the apparatus is not actively viewed by a user comprises determination that an eye of the user is not proximate to the display based, at least in part, on the proximity sensor information.

In at least one example embodiment, the proximity sensor information indicating an object being beyond a threshold distance from the display indicates absence of the user.

In at least one example embodiment, the different environmental sensor information comprises touch sensor information indicative of a user not holding the apparatus, and the determination that the different environmental sensor information indicates that the apparatus is not actively viewed by a user comprises determination that the user is not holding the apparatus based, at least in part, on the touch sensor information.

BRIEF DESCRIPTION OF THE DRAWINGS

For a more complete understanding of embodiments of the invention, reference is now made to the following descriptions taken in connection with the accompanying drawings in which:

FIGS. 3A-3C are diagrams illustrating a display in relation to display angles according to at least one example embodiment;

FIGS. 6A-6C are diagrams illustrating a virtual screen of information according to at least one example embodiment;

DETAILED DESCRIPTION OF THE DRAWINGS

Figure 1:
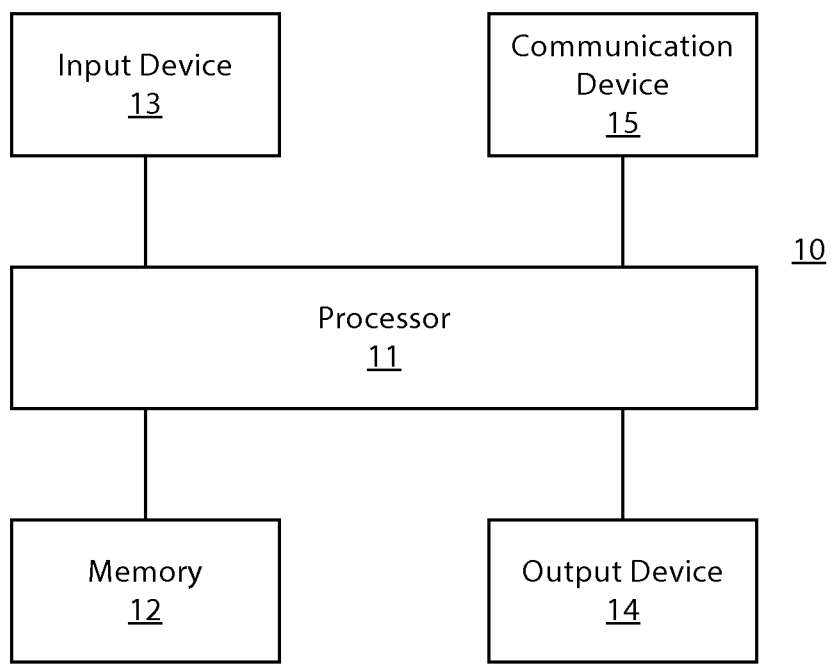
FIG. 1 is a block diagram showing an apparatus according to at least one example embodiment.

An embodiment of the invention and its potential advantages are understood by referring to FIGS. 1 through 13 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a pendant apparatus, a monocular apparatus, a peripheral apparatus, a near eye display apparatus, a wearable apparatus, a viewfinder apparatus, a telescope apparatus, a monoscopic image apparatus, a binocular apparatus, a stereoscopic apparatus, a virtual reality apparatus, an augmented reality apparatus, a kaleidoscope apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2F are diagrams illustrating an apparatus according to at least one example embodiment. The examples of FIGS. 2A-2F are merely examples and do not limit the scope of the claims. For example, size of the apparatus, may vary, the shape of the apparatus may vary, the configuration of the apparatus may vary, and/or the like.

In some circumstances, it may be desirable to configure an electronic apparatus as a pendant apparatus. For example, configuration of an electronic apparatus as a pendant apparatus may permit a user of the electronic apparatus to easily transport the apparatus, wear the apparatus, interact with the apparatus, and/or the like. A pendant apparatus may refer to an electronic apparatus, such as an electronic apparatus similar as described regarding FIG. 1, comprising a pendant form factor. For example, an apparatus comprising a pendant form factor may comprise provisions for attaching the pendant apparatus to a necklace, easily handling the apparatus in the hand of a user, standing the apparatus upright on a table, and/or the like. In at least one example embodiment, a pendant apparatus comprises a necklace.

In some circumstances, it may be desirable for a pendant apparatus to comprise a display. For example, it may be desirable to display information to a user of the pendant apparatus. It may be desirable, in some circumstances, for a display comprised by a pendant apparatus to be a near eye display. For example, a near eye display may allow for the size of the apparatus to remain compact, allow for a user to view the display at a near distance with clarity, and/or the like. In at least one example embodiment, a pendant apparatus comprises a near eye display. In some circumstances, the pendant apparatus may be configured such that the near eye display is best viewed by a single eye of the user. In circumstances such as these, the pendant apparatus may be referred to as a monocular apparatus.

In some circumstances it may be desirable for a pendant apparatus to comprise multiple displays. For example, a pendant apparatus may be configured as a binocular apparatus. A binocular apparatus may refer to an electronic apparatus in which a first display is configured for viewing by a left eye of a user and a second display is configured for viewing by a right eye of a user, such that the displays may be viewed simultaneously by the user.

In some circumstances, it may be desirable for a pendant apparatus to receive environmental sensor information. For example, the apparatus may determine an apparatus orientation, a user input, an apparatus mode, and/or the like by receiving environmental sensor information from at least one environmental sensor. An environmental sensor may refer to an input device similar as described regarding FIG. 1. For example, an environmental sensor may be a touch sensor, an orientation sensor, an accelerometer, an infrared sensor, an optical sensor, a proximity sensor, a gyro, a magnetometer, an inertial sensor, and/or the like.

Figure 2A:
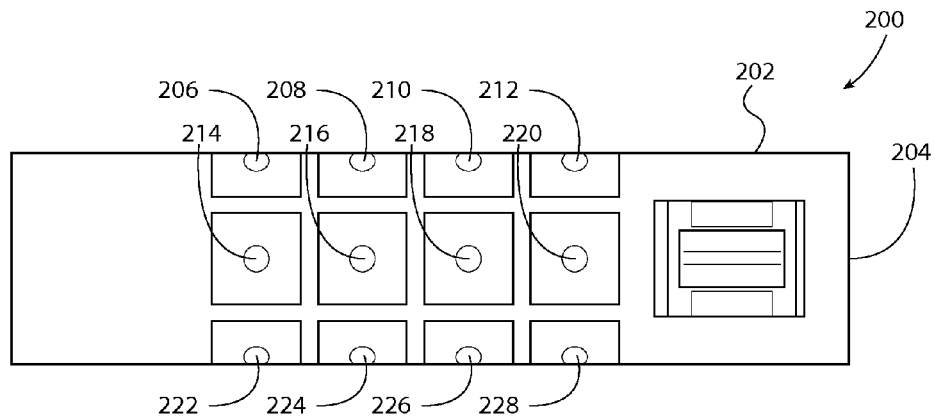
FIGS. 2A-2F are diagrams illustrating an apparatus according to at least one example embodiment
Figure 2B:
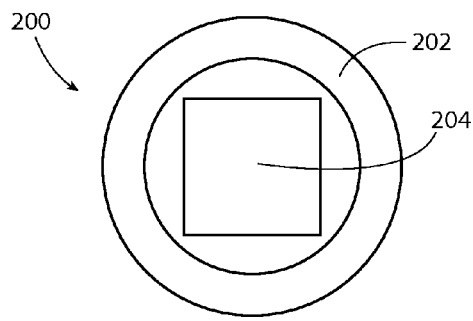
Figure 2C:
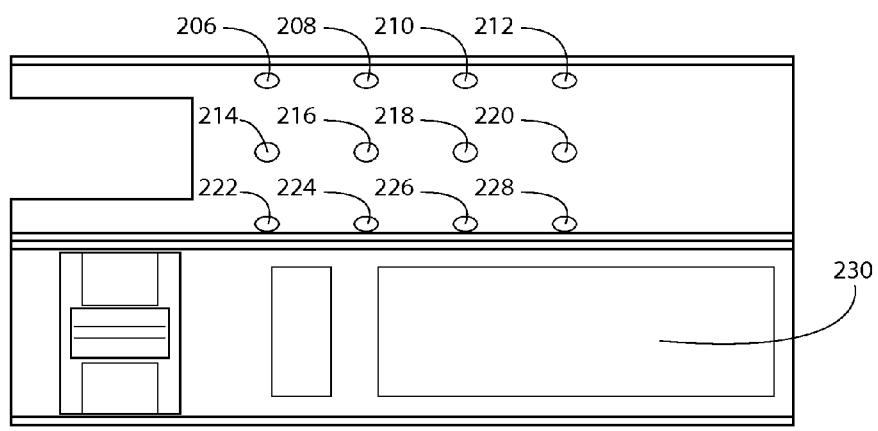

The examples of FIG. 2A-2C are diagrams illustrating apparatus 200 according to at least one example embodiment. FIG. 2A is a perspective view, FIG. 2B is a front view, and FIG. 2C is a cutaway view of the same example. In the example of FIGS. 2A-2C, apparatus 200 comprises enclosure 202, display 204, environmental sensors 206, 208, 210, 212, 214, 216, 218, 220, 222, 224, 226, and 228, and processor 230. The example of FIGS. 2A-2C depict apparatus 200 as a pendant apparatus, but it should be understood that apparatus 200 may be any type of electronic apparatus.

In some circumstances, a user may have an electronic apparatus similar as described regarding FIGS. 2A-2C under his control. In circumstances such as these, the apparatus may receive a notification of a message, a calendar alert, and/or the like. It may be desirable in circumstances such as these for the viewer to actively view the apparatus to perceive the notification, dismiss the alert, and/or the like. For example, the user may place the apparatus near his eyes, face the apparatus in his direction, and/or the like to actively view the apparatus. During active viewing of the apparatus, a user may be focusing his attention on the apparatus, interacting with the apparatus, and/or the like. For example, during an active viewing of the apparatus, a user may be actively reading information displayed on a display comprised by the apparatus.

Figure 2D:
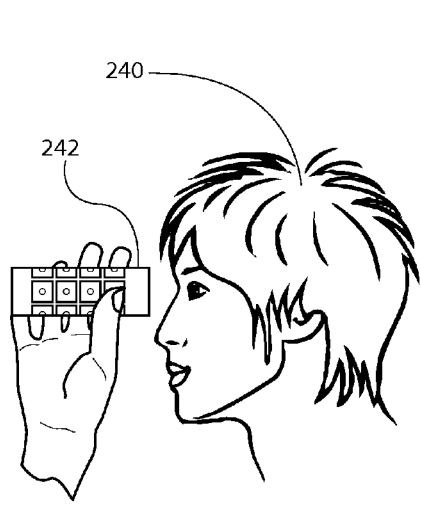

FIG. 2D is a diagram illustrating user 240 actively viewing a display comprised by apparatus 242. Even though the example of FIG. 2D depicts apparatus 242 as a pendant apparatus, apparatus 242 may be any type of electronic apparatus.

As previously described, in some circumstances, a user may have an electronic apparatus similar as described regarding FIGS. 2A-2C under his control. In some circumstances, an apparatus may be positioned such that the apparatus may not be actively viewed by the user. For example, the apparatus may be placed on a desk, placed in the user's pocket, worn on the user's body, and/or the like. In circumstances such as these, a display comprised by an apparatus may be passively viewed by a user of the apparatus. During passive viewing of the apparatus, a user may be focusing his attention on something other than the apparatus, ignoring the apparatus, viewing the apparatus with his peripheral vision, viewing the apparatus from a distance, and/or the like. For example, during passive viewing of the apparatus, a user may be reading information displayed on a display comprised by a different apparatus, performing a task independent of the apparatus, and/or the like. In this manner, an apparatus that is being passively viewed is not being actively viewed.

Figure 2E:
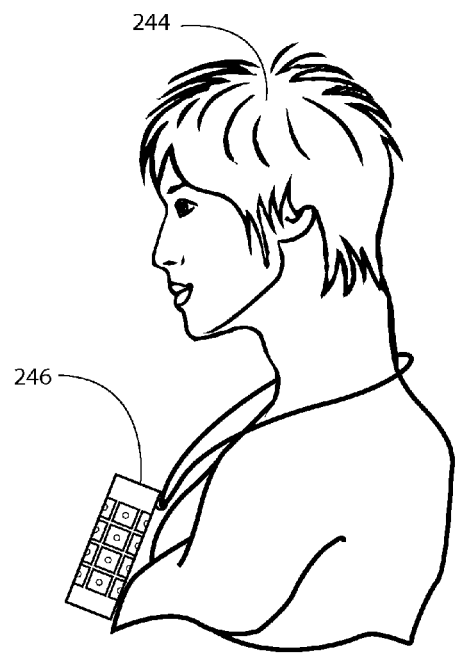

FIG. 2E is a diagram illustrating user 244 passively viewing a display comprised by apparatus 246. Even though the example of FIG. 2E depicts apparatus 244 as a pendant apparatus, apparatus 244 may be any type of electronic apparatus. It can be seen that apparatus 246 is attached to a necklace worn by user 244. Even though the example of FIG. 2E depicts apparatus 246 as being worn by user 244, apparatus 246 may be attached to user 244's clothing, carried in a pocket, carried in user 244's hand, and/or the like, such that apparatus 246 may be passively viewed by user 244.

Figure 2F:
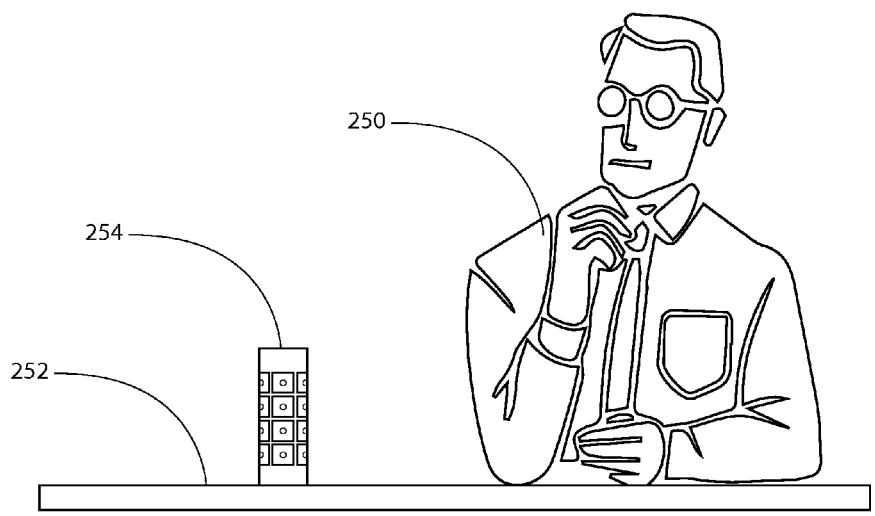

FIG. 2F is a diagram illustrating user 250 sitting at desk 252 passively viewing a display comprised by apparatus 254. Even though the example of FIG. 2F depicts apparatus 254 as a pendant apparatus, apparatus 254 may be any type of electronic apparatus. It can be seen that apparatus 254 is positioned upright on the top surface of desk 252. Even though the example of FIG. 2E depicts apparatus as upright on the top surface of desk 252, apparatus 254 may positioned in other positions such that apparatus 254 may be passively viewed by user 250. For example, apparatus 254 may be placed upright on a floor surface, laying on a side of apparatus 254 on top of a surface of desk 252, and/or the like.

As previously described, a user may be actively viewing an apparatus. For example, the user may be interacting with the apparatus in a manner similar to user 240 of FIG. 2D interacting with apparatus 242. In circumstances such as these, it may be desirable for an apparatus to enter an active viewing state of the apparatus. For example, an apparatus may determine that the apparatus is being actively viewed by a user based, at least in part, on the active viewing state of the apparatus. An active viewing state may be characterized by a state in which the apparatus is configured in a manner that avoids visual impairment compensation. Visual impairment compensation may refer to the rendering of visual information in a manner that it is easier to perceive and/or comprehend when viewing conditions are less than ideal. For example, visual information rendered with visual impairment compensation may be rendered with a lower pixel resolution, with a higher brightness level, without textual information, and/or the like. Alternatively, visual information rendered without visual impairment compensation may be rendered with an increased pixel resolution, with a lower brightness level, with textual information, and/or the like.

As previously described, a user may be passively viewing an apparatus, not viewing an apparatus, and/or the like. For example, the apparatus may be passively viewed similar as described regarding FIGS. 2E-2F. In circumstances such as these, the user may transition from passive to active viewing. For example, a user may move the apparatus from a position similar as depicted in FIG. 2E or 2F to a position similar as depicted in FIG. 2D. In circumstances such as these, it may be desirable for an apparatus to enter an active viewing state of the apparatus, based, at least in part, on environmental sensor information. For instance, environmental sensor information may indicate that the apparatus is actively viewed by a user. For example, environmental sensor information may indicate that the apparatus has an apparatus orientation with respect to a user. In such an example, the apparatus orientation may be similar to the orientation of apparatus 242 of FIG. 2D with respect to user 240. In at least one example embodiment, the apparatus enters an active viewing state of the apparatus based, at least in part, on the determination that the environmental sensor information indicates that the apparatus is actively viewed by the user.

In some circumstances, an orientation of the apparatus may indicate that the apparatus is actively viewed by the user. For example, the apparatus may be oriented such that a display comprised by the apparatus is in a position in which the view is unobscured. For instance, the orientation of the apparatus when being actively viewed may be similar to the orientation of apparatus 242 of FIG. 2D. In circumstances such as these, it may be desirable for environmental sensor information to indicate that the apparatus is actively viewed by the user based, at least in part, on the orientation of the apparatus. In at least one example embodiment, determination that the environmental sensor information indicates that the apparatus is actively viewed by a user comprises determination that an orientation of the apparatus indicates that the apparatus is actively viewed by the user. In some circumstances, the direction of gravity in relation to an apparatus may indicate may indicate that apparatus is actively viewed by a user. For example, the apparatus may be actively viewed if the direction of gravity substantially parallel to a surface of a display comprised by the apparatus. For instance, it can be seen that the direction of gravity in FIG. 2D is substantially parallel to the display of apparatus 242. In at least one example embodiment, environmental sensor information comprises information indicative of a direction of gravity in relation to the apparatus. In at least one example embodiment, the direction of gravity is substantially parallel to the surface of the display in circumstances where the direction of gravity deviates from being exactly parallel to the surface of the display within a predetermined threshold angle. In at least one example embodiment, the threshold angle is a predetermined angle, such as 15 degrees, 28 degrees, 45 degrees, and/or the like. In at least one example embodiment, the threshold angle varies based, at least in part, on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example, the threshold angle may be larger when the user is further from the apparatus, when the apparatus is larger in size, and/or the like. In another example, the threshold angle may be smaller when the user is closer to the apparatus, when the apparatus is smaller in size, and/or the like.

In some circumstances, an eye of a user proximate to a display comprised by an apparatus may indicate that the apparatus is actively viewed by the user. For example, the display may be a near eye display. A user actively viewing a near eye display may have their eye proximate to the display in a similar manner to user 240's eye being proximate to apparatus 242 of FIG. 2D. In circumstances such as these, it may be desirable for environmental sensor information to indicate that the apparatus is actively viewed by the user based, at least in part, a determination that an eye of the user is proximate to the display. For example, the environmental sensor may be a proximity sensor, an infrared sensor, a sonar, a radar, a capacitive sensor, a light sensor, and/or the like, comprised by the apparatus. In at least one example embodiment, determination that the environmental sensor information indicates that the apparatus is actively viewed by a user comprises determination that an eye of the user is proximate to the display. In at least one example embodiment, the environmental sensor information comprises proximity sensor information that indicates proximity of the user in relation to the display. In at least one example embodiment, the proximity sensor information indicates proximity of the user in circumstances where the proximity sensor information indicates an object being within a threshold distance from the display. In at least one example embodiment, the threshold distance is a predetermined distance, such as 2 centimeters, 4 centimeters, 8 centimeters, and/or the like. In at least one example embodiment, the threshold distance varies based, at least in part, on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example, the threshold distance may be larger when the user is further from the apparatus, when the apparatus is larger in size, and/or the like. In another example, the threshold distance may be smaller when the user is closer to the apparatus, when the apparatus is smaller in size, and/or the like.

In some circumstances, a user holding an apparatus may indicate that the apparatus is actively viewed by the user. For example, a user may necessarily hold an apparatus while interacting with software associated with the apparatus. For instance, the apparatus may comprise touch sensors as an input for software control. A user actively viewing an apparatus may hold the apparatus in a similar manner to user 240 holding apparatus 242 of FIG. 2D. In circumstances such as these, it may be desirable for environmental sensor information to indicate that the apparatus is actively viewed by the user based, at least in part, on determination that the user is holding the apparatus. In at least one example embodiment, determination that the environmental sensor information indicates that the apparatus is actively viewed by a user comprises determination that the user is holding the apparatus. In at least one example embodiment, the environmental sensor information comprises touch sensor information indicative of a user holding the apparatus.

In some circumstances, it may be desirable to determine that an apparatus is actively viewed by a user based, at least in part, on a combination of environmental sensor information received from different environmental sensors. For instance, environmental sensor information may indicate that the apparatus is being actively viewed when no active viewing is occurring. For example, a user may briefly hold an apparatus to move it out of his way, or the apparatus may have an orientation consistent with viewing of the apparatus even though the apparatus is not being actively viewed. In circumstances such as these, the apparatus may determine that an apparatus is actively viewed by a user if a combination of environmental sensor information received from different environmental sensors is consistent with being actively viewed by a user. For example, the apparatus may determine that it is being actively viewed if it has a particular orientation and is simultaneously being held, if the apparatus is being held and the apparatus is proximate to the eye of the user, and/or the like.

As previously described, a user may be passively viewing an apparatus, not viewing an apparatus, and/or the like. For example, the apparatus may be passively viewed similar as described regarding FIGS. 2E-2F. In circumstances such as these, it may be desirable for an apparatus to enter a passive viewing state of the apparatus. For example, an apparatus may determine that the apparatus is not being actively viewed by a user based, at least in part, on the passive viewing state of the apparatus. A passive viewing state may be an operational state in which information is caused to be displayed in conformance with an impaired-viewing display mode absent display of information in an unimpaired-viewing display mode. A passive viewing state may be characterized by a state in which the apparatus is configured in a manner that provides visual impairment compensation.

As previously described, a user may be actively viewing an apparatus. For example, the user may be interacting with the apparatus in a manner similar to user 240 of FIG. 2D interacting with apparatus 242. In circumstances such as these, the user may transition from active to passive viewing. For example, a user may move the apparatus from a position similar as depicted in FIG. 2D to a position similar as depicted in FIG. 2E and/or FIG. 2F. In circumstances such as these, it may be desirable for an apparatus to enter a passive viewing state of the apparatus, based, at least in part, on environmental sensor information. For instance, environmental sensor information may indicate that the apparatus is not actively viewed by a user. For example, environmental sensor information may indicate that the apparatus has an apparatus orientation with respect to a user similar to the orientation of apparatus 246 of FIG. 2E with respect to user 244, similar to the orientation of apparatus 254 of FIG. 2F with respect to user 250, and/or the like. In at least one example embodiment, the apparatus enters a passive viewing state of the apparatus based, at least in part, on the determination that the environmental sensor information indicates that the apparatus is not actively viewed by the user.

In some circumstances, an orientation of the apparatus may indicate that the apparatus is not actively viewed by the user. For example, the apparatus may be oriented such that a display comprised by the apparatus is in a position in which the view is obscured. For instance, the orientation of the apparatus when being actively viewed may be similar to the orientation of apparatus 246 of FIG. 2E. In circumstances such as these, it may be desirable for environmental sensor information to indicate that the apparatus is not actively viewed by the user based, at least in part, on the orientation of the apparatus. In at least one example embodiment, determination that the environmental sensor information indicates that the apparatus is not actively viewed by a user comprises determination that an orientation of the apparatus indicates that the apparatus is not actively viewed by the user. In at least one example embodiment, the environmental sensor is a magnetometer, and environmental sensor information is indicative of an orientation of the apparatus relative to the magnetic north pole of the Earth. In some circumstances, the direction of gravity in relation to an apparatus may indicate may indicate that apparatus is not actively viewed by a user. For example, the apparatus may not be actively viewed if the direction of gravity substantially perpendicular to a surface of a display comprised by the apparatus. For instance, it can be seen that the direction of gravity in FIG. 2E is substantially perpendicular to the display of apparatus 246, and that the direction of gravity in FIG. 2F is substantially perpendicular to the display of apparatus 254. In at least one example embodiment, the direction of gravity is substantially perpendicular to the surface of the display in circumstances where the direction of gravity deviates from being exactly perpendicular to the surface of the display within a predetermined threshold angle. In at least one example embodiment, the threshold angle may be a predetermined angle, such as 15 degrees, 20 degrees, 45 degrees, and/or the like. In at least one example embodiment, the threshold angle varies based, at least in part, on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example, the threshold angle may be larger when the user is further from the apparatus, when the apparatus is larger in size, and/or the like. In another example, the threshold angle may be smaller when the user is closer to the apparatus, when the apparatus is smaller in size, and/or the like.

In some circumstances, absences of an eye of a user proximate to a display comprised by an apparatus may indicate that the apparatus is not actively viewed by the user. For example, the display may be a near eye display. A user not actively viewing a near eye display may have their eye distant to the display in a similar manner to user 244's eye being distant to apparatus 246 of FIG. 2E, user 250's eye being distant to apparatus 254 of FIG. 2F, and/or the like. In circumstances such as these, it may be desirable for environmental sensor information to indicate that the apparatus is not actively viewed by the user based, at least in part, a determination that an eye of the user is distant to the display. For example, the environmental sensor may be a proximity sensor, an infrared sensor, a sonar, a radar, a capacitive sensor, a light sensor, and/or the like comprised by the apparatus. In at least one example embodiment, determination that the environmental sensor information indicates that the apparatus is not actively viewed by a user comprises determination that an eye of the user is distant to the display. In at least one example embodiment, the proximity sensor information indicates distance from the user in circumstances where the proximity sensor information indicates an object being beyond a threshold distance from the display. In at least one example embodiment, the threshold distance is a predetermined distance, such as 20 centimeters, 30 centimeters, 50 centimeters, and/or the like. In at least one example embodiment, the threshold distance varies based, at least in part, on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example, the threshold distance may be larger when the user is further from the apparatus, when the apparatus is larger in size, and/or the like. In another example, the threshold distance may be smaller when the user is closer to the apparatus, when the apparatus is smaller in size, and/or the like.

In some circumstances, absence of a user holding an apparatus may indicate that the apparatus is not actively viewed by the user. For example, it may be necessary for a user to hold an apparatus to interact with software associated with the apparatus. For instance, the apparatus may comprise touch sensors as an input for software control. A user that is not actively viewing an apparatus may not be holding the apparatus in a similar manner to user 244 not holding apparatus 246 of FIG. 2E, user 250 not holding apparatus 254 of FIG. 2F, and/or the like. In circumstances such as these, it may be desirable for environmental sensor information to indicate that the apparatus is not actively viewed by the user based, at least in part, on determination that the user is not holding the apparatus. In at least one example embodiment, determination that the environmental sensor information indicates that the apparatus is not actively viewed by a user comprises determination that the user is not holding the apparatus. In at least one example embodiment, the environmental sensor information comprises touch sensor information indicative of a user not holding the apparatus.

In some circumstances, it may be desirable to determine that an apparatus is not actively viewed by a user based, at least in part, on a combination of environmental sensor information received from different environmental sensors. For instance, environmental sensor information may indicate that the apparatus is not being actively viewed when active viewing is occurring. For example, a user may briefly pull the apparatus away from his eye, the apparatus may have an orientation inconsistent with viewing of the apparatus even though the apparatus is being actively viewed, and/or the like. In circumstances such as these, the apparatus may determine that an apparatus is not actively viewed by a user if a combination of environmental sensor information received from different environmental sensors is consistent with not being actively viewed by a user. For example, the apparatus may determine that it is not being actively viewed if it has a particular orientation and is simultaneously not being held, if the apparatus is not being held and the apparatus is distant from the eye of the user, and/or the like.

FIGS. 3A-3C are diagrams illustrating a display in relation to display angles according to at least one example embodiment. The examples of FIGS. 3A-3C are merely examples and do not limit the scope of the claims. For example, display design and/or shape may vary, display configuration may vary, display angle may vary, and/or the like.

As previously discussed, in some circumstances, a user may desire to utilize an apparatus, such as the apparatus described in the examples of FIGS. 2A-2F, to perceive and/or interact with information, such as content, software, textual information, graphical information, and/or the like. For example, while the apparatus is being actively viewed by the user, the user may view textual content, browse with graphical content, interact with software, and/or the like. As such, it may be desirable to provide for a method of interacting with such information via the apparatus that is easy and intuitive. The examples of FIGS. 2A-2F depict an apparatus that is characterized by a tubular form factor, similar to a monocular apparatus, a kaleidoscope, and/or the like. As the user peers into the apparatus at a display comprised by the apparatus, it may be desirable to provide for an easy and intuitive manner in which to interact with information displayed on the display. In many circumstances, a user may be familiar with one or more manners in which to scroll, pan, browse, navigate, and/or the like, within such information. For example, the user may be familiar with a rotational input, a turning input, and/or the like. As such, it may be desirable to configure the apparatus such that the user of the apparatus may interact with information displayed on the display by way of a rotational input, a turning input, and/or the like. For example, the user may tumble the apparatus about its axis while peering at the display comprised by the apparatus. In this manner, the apparatus itself may be utilized as an input device for purposes associated with viewing textual content, browsing graphical content, interacting with software, and/or the like.

In order to facilitate such interaction with information by way of an apparatus, it may be desirable to determine an orientation of the apparatus. In many circumstances, a user may be interacting with information while the user is peering at a display of the apparatus. In such circumstances, it may be desirable to configure the apparatus such that information displayed on the display remains in an upright orientation while the user of the apparatus rolls, spins, twists, and/or the like, the apparatus. As such, it may be desirable to determine an orientation of the apparatus based upon the rotation of the display of the apparatus with respect to a gravitational force. In at least one example embodiment, an apparatus determines a display angle of a display comprised by the apparatus. In such an example embodiment, the display angle may be an angle of the display with respect to gravity. For example, determination of the display angle with respect to gravity may comprise receipt of sensor information that indicates a direction of gravity, and determination of the display angle may be based, at least in part, on the direction of gravity in relation to the display. In such an example, the determination of the display angle may comprise determination that the direction of gravity differs from a predetermined reference angle by the display angle. The predetermined reference angle may, for example, correspond with a predetermined edge of the display, a predetermined position on the display, a predetermined orientation of the display, and/or the like. In at least one example embodiment, the predetermined reference angle corresponds with an angle that is perpendicular to a bottom of the display. In such an example embodiment, the bottom of the display may be a lower edge of the display, a position at the intended bottom of the display, a bottom of the display such that the display is in an upright orientation while the apparatus is in an upright position, and/or the like. The sensor information may be received from an accelerometer sensor, a gyroscopic sensor, an orientation sensor, a gravitational force sensor, and/or the like.

FIGS. 3A-3C are diagrams illustrating a display in relation to display angles according to at least one example embodiment. The example of FIG. 3A depicts display 300, having bottom edge 301, in relation to gravity 302 and display angles 304A, 304B, and 304C. The example of FIG. 3B depicts display 310, having bottom edge 311, in relation to gravity 312 and display angles 314A, 314B, and 314C. The example of FIG. 3C depicts display 320, having bottom edge 321, in relation to gravity 322 and display angles 324A, 324B, and 324C. In some circumstances, display 300 of FIG. 3A may correspond with display 310 of FIG. 3B and/or display 320 of FIG. 3C. In such circumstances, each of display angles 304A-304C of FIG. 3A may correspond with each of display angles 314A-314C of FIG. 3B and/or each of display angles 324A-324C of FIG. 3C, respectively. In this manner, the progression of the example of FIGS. 3A-3C may depict a display that is being reoriented from the display angle of display 300 in the example of FIG. 3A, to the display angle of display 310 in the example of FIG. 3B, and to the display angle of display 320 in the example of FIG. 3C.

In the example of FIG. 3A, display angle 304A is approximately parallel to gravity 302. As can be seen, display 300 is oriented such that bottom edge 301 is positioned at the bottom of display 300, and gravity 302 is perpendicular to bottom edge 301 of display 300. In this manner, display 300 may be oriented in an upright orientation, a predetermined default orientation, and/or the like. As can be seen, display angle 304A is directed towards and is perpendicular to bottom edge 301. In this manner, display angle 304A may indicate that the display is in an upright orientation, a predetermined default orientation, and/or the like. For example, display angle 304A may indicate that the display is rotated 0-degrees from the upright orientation of the display, from the predetermined default orientation of the display, and/or the like. In this manner, the display angle of display 300 may be 0-degrees.

In the example of FIG. 3B, display angle 314B is approximately parallel to gravity 312. As can be seen, display 310 is oriented such that bottom edge 311 has rotated in relation to bottom edge 301 of FIG. 3A, and gravity 312 fails to be perpendicular to bottom edge 311 of display 310. In this manner, display 310 may fail to be oriented in an upright orientation, a predetermined default orientation, and/or the like. As can be seen, display angle 314A is directed towards and is perpendicular to bottom edge 301, and display angle 314B is approximately parallel to gravity 312. In this manner, display angle 314B may indicate an angle of rotation away from display angle 314A. For example, display angle 314B may indicate that the display is rotated 45-degrees from the upright orientation of the display, from the predetermined default orientation of the display, and/or the like. In this manner, the display angle of display 310 may be 45-degrees.

In the example of FIG. 3C, display angle 324C is approximately parallel to gravity 322. As can be seen, display 320 is oriented such that bottom edge 321 has rotated in relation to bottom edge 301 of FIG. 3A and bottom edge 311 of FIG. 3B, and gravity 322 fails to be perpendicular to bottom edge 321 of display 320. In this manner, display 320 may fail to be oriented in an upright orientation, a predetermined default orientation, and/or the like. As can be seen, display angle 324A is directed towards and is perpendicular to bottom edge 321, and display angle 324C is approximately parallel to gravity 322. In this manner, display angle 324C may indicate an angle of rotation away from display angle 324A. For example, display angle 324C may indicate that the display is rotated 90-degrees from the upright orientation of the display, from the predetermined default orientation of the display, and/or the like. In this manner, the display angle of display 320 may be 90-degrees.

As discussed previously, in many circumstances, a user may desire to interact with information displayed on a display of an apparatus by way of reorienting the apparatus from a first orientation to a second orientation, from a first orientation to a third orientation, and/or the like. In order to facilitate such interaction, it may be desirable to configure an apparatus such that the apparatus may enable such interaction by way of reorientation of the apparatus, reorientation of the display, and/or the like. As such, it may be desirable to configure the apparatus such that the apparatus may determine a display angle of the first orientation, a display angle of the second orientation, and/or a display angle of the third orientation, such that the apparatus may facilitate interaction with information by way of reorienting the apparatus from a display angle to a different display angle. In at least one example embodiment, an apparatus determines a contiguous subset of a sequential arrangement of information based, at least in part, on a display angle. In such an example embodiment, the sequential arrangement of information may be any information that is arranged in a sequential or ordered manner. For example, the sequential arrangement of information may be a list of information, an array of information, a matrix of information, a group of textual messages, a textual document, a gallery of graphical content, a collection of still frames of a video, and/or the like. In such an example, the contiguous subset of the sequential arrangement of information may be, respectively, one or more items on the list of information, one or more array elements of the array of information, one or more matrix elements of the matrix of information, one or more textual messages of the group of textual messages, one or more words of the textual document, one or more pictures of the gallery of pictures, one or more still frames of the video, and/or the like.

As discussed previously, in order to interact with information displayed on the display of an apparatus, the user of the apparatus may reorient the apparatus and/or the display such that the display angle of the display changes from a display angle to a different display angle. As discussed previously, in at least one example embodiment, an apparatus determines a display angle of the display with respect to gravity, and determines a contiguous subset of a sequential arrangement of information based, at least in part, on the display angle. In such an example embodiment, the user may subsequent reorient the apparatus and/or the display such that the display is at a different display angle. In at least one example embodiment, an apparatus determines another display angle of the display with respect to gravity. In such an example embodiment, the other display angle may be different from the display angle. In such an example embodiment, the apparatus may determine another contiguous subset of the sequential arrangement based, at least in part, on the other display angle. The contiguous subset may be different from the other contiguous subset, the contiguous subset may comprise a portion of the other contiguous subset that is less than an entirety of the other contiguous subset, and/or the like.

In order to provide for easy and intuitive interaction by way of reorienting a display of an apparatus from a display angle to a different display angle, it may be desirable to configure the apparatus such that the determination of a contiguous subset of a sequential arrangement of information is performed in a manner that is intuitive and predictable. As such, it may be desirable to base such a determination, at least in part, on a difference between the display angle and the other display angle. As discussed previously, an apparatus may determine a first display angle of the display with respect to gravity, determine a first contiguous subset of a sequential arrangement of information, and, subsequently, determine a second display angle of the display with respect to gravity. As such, it may be desirable to determine a second contiguous subset of a sequential arrangement of information based, at least in part, on the difference between the first display angle and the second display angle. In at least one example embodiment, determination of a second contiguous subset comprises determination of an angular change between a first display angle and a second display angle, and determination of the second contiguous subset based, at least in part, on the angular change and the first contiguous subset. For example, the angular change may be such that the second contiguous subset comprises at least a portion of the first contiguous subset, such that the second contiguous subset fails to comprise any portion of the first contiguous subset, and/or the like. As such, in such an example, it may be desirable to determine the second contiguous subset based, at least in part, on a relative position of the first contiguous subset and/or the second contiguous subset within the sequential arrangement of information. For example, the first contiguous subset may correspond with a first position within the sequential arrangement of information. In such an example, the determination of a second contiguous subset based, at least in part, on the angular change and the first contiguous subset may comprise determination of a magnitude of the angular change, and determination of a second position within the sequential arrangement of information based, at least in part, on the first position and the magnitude of the angular change. In this manner, the apparatus may determine the second contiguous subset such that the second contiguous subset corresponds with the second position within the sequential arrangement of information. The difference between the first position and the second position may be proportional to the magnitude of the angular change, scaled based, at least in part, on the magnitude of the angular change, dependent upon the magnitude of the angular change, and/or the like.

For example, an angular change between the display angle of display 300 of FIG. 3A and the display angle of display 310 of FIG. 3B may be 45-degrees. In such an example, the display angle of display 300 of FIG. 3A may be 0-degrees and the display angle of display 310 of FIG. 3B may be 45-degrees. As such, the difference between the two display angles, and thus the angular change, may be 45-degrees. In another example, an angular change between the display angle of display 310 of FIG. 3B and the display angle of display 320 of FIG. 3C may be 45-degrees. In such an example, the display angle of display 310 of FIG. 3B may be 45-degrees and the display angle of display 320 of FIG. 3C may be 90-degrees. As such, the difference between the two display angles, and thus the angular change, may be 45-degrees. In yet another example, an angular change between the display angle of display 300 of FIG. 3A and the display angle of display 320 of FIG. 3C may be 90-degrees. In such an example, the display angle of display 300 of FIG. 3A may be 0-degrees and the display angle of display 320 of FIG. 3C may be 90-degrees. As such, the difference between the two display angles, and thus the angular change, may be 90-degrees.

In many circumstances, a user may desire to interact with information displayed on a display of an apparatus in different manners. For example, the user may desire to scroll forward through information, browse backwards through content, navigate leftward through a menu, increment a value, decrease a size of an image, and/or the like. As such, it may be desirable to determine a direction in which a display has been reoriented. For example, the apparatus and/or the display may be rolled in one direction, the apparatus and/or the display may be rotated in a different direction, and/or the like. As such, it may be desirable to configure an apparatus such that the apparatus may determine a direction associated with an angular change of a display. In at least one example embodiment, an apparatus determines a direction of an angular change, and determines a second position within a sequential arrangement of information based, at least in part, on a first position, a magnitude of an angular change, and a direction of the angular change. In such an example embodiment, a positional direction from the first position to the second position may correspond with the direction of the angular change. For example, an incremental positional direction may correspond with a clockwise direction of the angular change and a decremental positional direction may correspond with a counter-clockwise direction of the angular change. In another example, an incremental positional direction may correspond with a counter-clockwise direction of the angular change and a decremental positional direction may correspond with a clockwise direction of the angular change.

For example, an angular change between the display angle of display 300 of FIG. 3A and the display angle of display 310 of FIG. 3B may be positive 45-degrees. In such an example, the display angle of display 300 of FIG. 3A may be 0-degrees and the display angle of display 310 of FIG. 3B may be 45-degrees. In such an example, a rotation in a clockwise direction may be indicative of an incremental rotation, a positive direction, and/or the like. As such, the difference between the two display angles, and thus magnitude and/or the direction of the angular change, may be positive 45-degrees, clockwise 45-degrees, and/or the like. In another example, an angular change between the display angle of display 320 of FIG. 3C and the display angle of display 300 of FIG. 3A may be negative 90-degrees. In such an example, the display angle of display 320 of FIG. 3C may be 90-degrees and the display angle of display 300 of FIG. 3A may be 0-degrees. In such an example, a rotation in a counter-clockwise direction may be indicative of a decremental rotation, a negative direction, and/or the like. As such, the difference between the two display angles, and thus magnitude and/or the direction of the angular change, may be negative 90-degrees, counter-clockwise 90-degrees, and/or the like.

Figure 4A:
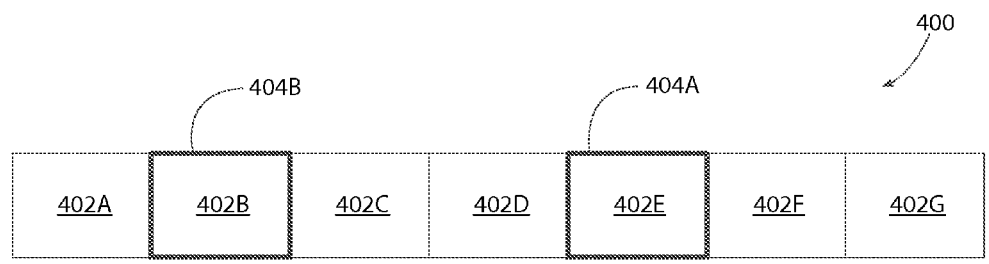
FIGS. 4A-4C are diagrams illustrating an array of array elements according to at least one example embodiment.
Figures 4B, 4C:
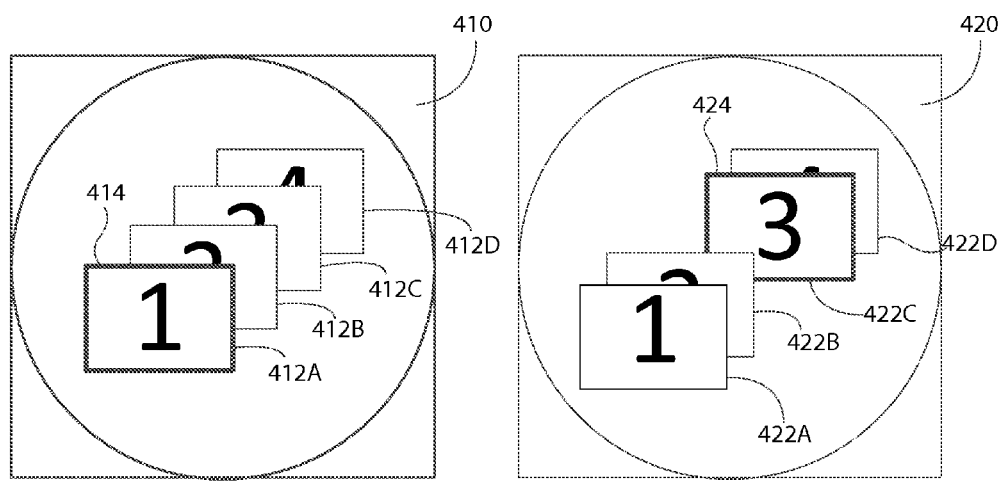

FIGS. 4A-4C are diagrams illustrating an may of array elements according to at least one example embodiment. The examples of FIGS. 4A-4C are merely examples and do not limit the scope of the claims. For example, display configuration may vary, display angle may vary, array of array elements configuration and/or arrangement may vary, array element configuration may vary, representations of array elements may vary, representation of an array of array elements may vary, representation of selection of an array element may vary, and/or the like.

As previously discussed, in some circumstances, a user may desire to utilize an apparatus to perceive and/or interact with information, such as content, software, textual information, graphical information, and/or the like. In such circumstances, the apparatus may determine a display angle of a display of the apparatus, and determine a contiguous subset of a sequential arrangement of information based, at least in part, on the display angle. In order to facilitate user viewing of the contiguous subset of a sequential arrangement of information, user perception of information associated with the contiguous subset of a sequential arrangement of information, user interaction with the contiguous subset of a sequential arrangement of information, and/or the like, it may be desirable to perform one or more operations based, at least in part, on the contiguous subset. For example, the apparatus may determine a first display angle of a display comprised by the apparatus and a first contiguous subset of a sequential arrangement of information, and, subsequently, perform a first operation based, at least in part, on the first contiguous subset. In such an example, the apparatus may be reoriented by a user such that the apparatus determines a second display angle of the display, and determines a second contiguous subset of the sequential arrangement of information. In such an example, the apparatus may perform a second operation based, at least in part, on the second contiguous subset. In such an example embodiment, the first operation may be different from the second operation, the first operation may be similar to the second operation, the first operation may be identical the second operation, and/or the like.

In many circumstances, a user may desire to interact with information in various ways depending on what type of information the user is interacting with. For example, the user may desire to pan across an image such that various portions of the image are displayed, browse through an image gallery such that images are successively displayed, select a menu item, launch an application, display a textual document such that the user may read through the entirety of the textual document a portion at a time, and/or the like. As such, it may be desirable to configure an apparatus such that the apparatus performs various operations based, at least in part, on a type or classification of a sequential arrangement of information being interacted with.

In at least one example embodiment, the sequential arrangement of information is an array of array elements. For example, an array element may be an image, an icon, a value, a word, and/or the like. In such an example, the array of array elements may be an image gallery comprising the image, a menu comprising the icon, a list of numbers comprising the value, a sentence comprising the word, and/or the like. In such an example, a contiguous subsection of the sequential arrangement of information may be an array element. For example, a first contiguous subset may be a first array element of the array, and a second contiguous subset may be a second array element of the array. In this manner, a contiguous subset may comprise a single array element, a plurality of array elements, and/or the like.

In the context of an array of array elements, a user may desire to indicate selection of a particular array element of the array of array elements. For example, a first operation may comprise selection of the first array element, and a second operation may comprise selection of the second array element. In at least one example embodiment, an operation comprises display of an indication of the selection of the first array element. In such an example embodiment, it may be desirable to orient display of the indication of the selection of the first array element such that the indication is perceived as upright when viewed by a user of the apparatus. For example, a user may roll the apparatus and/or the display such that the display is at a first display angle. In such an example, it may be desirable to display the indication such that the indication is upright relative to gravity, is upright relative to a current orientation of the display, and/or the like. As such, in at least one example embodiment, an operation comprises display of an indication of the selection of an array element on a display such that the orientation of the indication of the selection of the array element on the display corresponds with a display angle of the display. For example, a first operation may comprise display of an indication of a selection of a first array element on a display such that the orientation of the indication of the selection of the first array element on the display corresponds with a first display angle. In such an example, a second operation may comprise display of an indication of a selection of the second array element on the display such that the orientation of the indication of the selection of the second array element on the display corresponds with the second display angle. For example, the apparatus may display a plurality of representations of array elements of an array of array elements. In such an example, the plurality of representations of array elements of the array of array elements may comprise a representation of the first array element, a representation of the second array element, and/or the like. In at least one example embodiment, a representation of an array element is a representation that allows for user perception of the array element on a display, user comprehension of information comprised by the array element, and/or the like. In such an example embodiment, the user may desire to interact with a particular array element and may select the particular array element by way of reorienting the device such that the array element is selected, such that the array element is displayed at a certain position on the display, and/or the like. In order to facilitate user perception of such, it may be desirable for an indication of the selection to be readily perceivable by the user. For example, an indication of a selection may be an indication that indicates selection of a particular array element of an array of array elements. An indication of a selection of an array element may indicate selection of an array element by way of highlighting of a representation of the array element, outlining of a representation of the array element, enlarging of a representation of the array element, or moving of a representation of the array element, and/or the like.

FIG. 4A is a diagram illustrating an array of array elements according to at least one example embodiment. The example of FIG. 4A depicts array 400 comprising array elements 402A-402G. Each of array elements 402A-402G may correspond with a particular display angle such that a user may indicate a desire to select any of array elements 402A-402G by way of orienting a display at a display angle that corresponds with a particular array element. As can be seen, indications 404A and 404B indicate selection of array elements 402E and 402B, respectively. In this manner, a display of an apparatus may have been oriented at a first display angle that corresponds with array element 402E and, subsequently, reoriented to a display angle that corresponds with array element 402B. In this manner, in at least one example embodiment, the display may have been rotated in a counter-clockwise direction such that the selected array element of array 400 decremented by three array elements. For example, a user may have rotated the apparatus such that the display was reoriented from the first display angle to the second display angle, causing termination of selection of array element 402E and causing selection of array element 402B.

FIG. 4B is a diagram illustrating an array of array elements according to at least one example embodiment. The example of FIG. 4B depicts display 410, which is displaying representations 412A-412D. Each of representations 412A-412D represent at least one array element of an array of array elements. As can be seen, indication 414 indicates selection of the array element represented by representation 412A. In some circumstances, the user may desire to select at least one array element represented by representations 412B-412D such that the array element is more visible on display 410, is displayed larger on display 410, and/or the like.

FIG. 4C is a diagram illustrating an array of array elements according to at least one example embodiment. The example of FIG. 4C depicts display 420, which is displaying representations 422A-422D. Each of representations 422A-422D represent at least one array element of an array of array elements. In at least one example embodiment, display 420 corresponds with display 410 of FIG. 4B. In this manner, each of array elements 422A-422D may correspond with each of array elements 412A-412D of FIG. 4B, respectively. As can be seen in the example of FIG. 4C, array element 422C has been selected, as indicated by indication 424. As depicted, representation 422C is more visible than the corresponding representation, representation 412C, in FIG. 4B.

In this manner, FIGS. 4B-4C may depict a sequence of orientations of the same display. For example, display 410 of FIG. 4B may be at a 0-degree display angle, and display 420 of FIG. 4C may be at a 90-degree display angle. For example embodiment, the display may have been rotated in a clockwise direction such that the selected array element incremented by two array elements, from the representation depicting a "1" to the representation depicting a "3". For example, a user may have rotated the apparatus such that the display was reoriented from the first display angle to the second display angle, causing termination of selection of array element 412A of FIG. 4B and causing selection of array element 422C of FIG. 4C.

FIGS. 5A-5E are diagrams illustrating an array of menu items and/or an array of program identifiers according to at least one example embodiment. The examples of FIGS. 5A-5E are merely examples and do not limit the scope of the claims. For example, display configuration may vary, display angle may vary, array of menu items configuration and/or arrangement may vary, menu item configuration may vary, representations of menu items may vary, representation of an array of menu items may vary, array of program identifiers configuration and/or arrangement may vary, program identifier configuration may vary, representations of program identifiers may vary, representation of an array of program identifiers may vary, representation of additional information may vary, content of additional information may vary, and/or the like.

As previously discussed, in some circumstances, a user may desire to interact with a menu associated with operation of the apparatus, to interact with menu-related information displayed on a display comprised by the apparatus, to interact with a menu that is associated with software that may be running on the apparatus, and/or the like. In such circumstances, it may be desirable to configure an apparatus such that the user of the apparatus may interact with the menu in an easy and intuitive manner. In at least one example embodiment, an array is an array of menu items. In such an example embodiment, an array element of the array of menu items may be a menu item. For example, a first array element may be a first menu item, a second array element may be a second menu item, and/or the like. In such circumstances, a user may desire to indicate selection of the first menu item, of the second menu item, and/or the like. As discussed previously, the user may desire to indicate selection of a particular menu item based, at least in part, on a position of the menu item and a display angle of the display of the apparatus. For example, a user may indicate selection of a particular menu item of the array of menu items by way of orienting the display such that the display angle of the display corresponds with a position of a representation of the menu item on the display. In at least one example embodiment, an apparatus causes display of a plurality of representations of array elements such that a representation of a first array element is displayed at a position that corresponds with a first display angle and a representation of a second array element is displayed at a position that corresponds with a second display angle. For example, a user may indicate selection of a particular menu item of the array of menu items by way of orienting the display such that the display angle of the display corresponds with a position of a representation of the menu item on the display. In at least one example embodiment, an apparatus causes display of a plurality of representations of menu items such that a representation of a first menu item is displayed at a position that corresponds with a first display angle and a representation of a second menu item is displayed at a position that corresponds with a second display angle. In such an example embodiment, a user may indicate a desire to select the first menu item by way of orienting the display at the first display angle, a desire to select the second program identifier by way of orienting the display at the second display angle, and/or the like. In at least one example embodiment, a position that corresponds with a display angle is a position along an axis that extends from a center of the display along the display angle. For example, the position that corresponds with the display angle may be any position along such an axis, a position along such an axis that is proximate to an outer edge of the display, and/or the like.

Figure 5A:
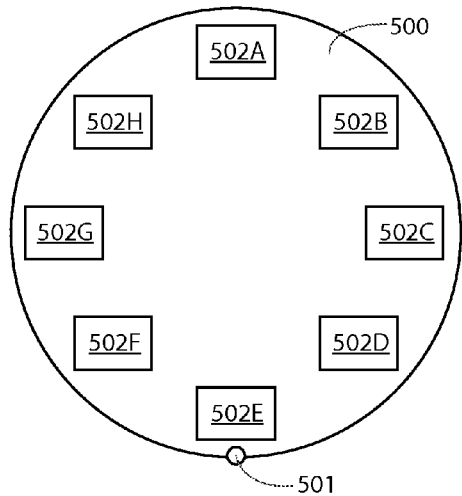
FIGS. 5A-5E are diagrams illustrating an array of menu items and/or an array of program identifiers according to at least one example embodiment.

FIG. 5A is a diagram illustrating an array of menu items according to at least one example embodiment. The example of FIG. 5A depicts display 500, having bottom 501, displaying representations 502A-502H. In the example of FIG. 5A, each of representations 502A-502H represent a menu item of an array of menu items. In this manner, in the example of FIG. 5A, display 500 is displaying a plurality of representations of menu items of an array of menu items. In the example of FIG. 5A, display 500 is oriented such that bottom 501 is at the bottom of display 500. As such, display 500 may be oriented in an upright orientation, in a predetermined default orientation, and/or the like. As can be seen in the example of FIG. 5A, each of representations 502A-502H is displayed such that the orientation of each of representations 502A-502H is based, at least in part, on the display angle of display 500. In this manner, each of representations 502A-502H is perceived by a viewer of display 500 to be upright, to be easily comprehendible, and/or the like.

As described previously, in many circumstances, a user may be interacting with information while the user is peering at a display of the apparatus. For example, the user may be interacting with an array of menu items by way of reorienting the display of the apparatus to a display angle, from a different display angle, and/or the like. In such circumstances, it may be desirable to configure the apparatus such that information displayed on the display remains in an upright orientation while the user of the apparatus rolls, spins, twists, and/or the like, the apparatus. For example, it may be desirable to ensure that user interface elements, such as a plurality of representations of menu items is displayed such that each representation is displayed in an upright orientation regardless of an orientation of the apparatus, of the display, and/or the like. As such, it may be desirable to display a representation of an array element based, at least in part, on an orientation of the apparatus, a display angle of the display, and/or the like, with respect to gravity. For example, an apparatus may display a plurality of representations of menu items of an array of menu items, determine a first display angle of a display comprised by the apparatus, and determine a first menu item of the array of menu items based, at least in part, on the first display angle. In order to provide a user with a comprehendible and upright user interface, in such an example, a first operation may comprise modification of orientation of the plurality of representations of array elements such that an orientation of each representation of the plurality of representations on the display corresponds with the first display angle. In this manner, each representation of the plurality of representations is displayed in an upright orientation such that the representations are easily comprehendible by the user. In such an example, the user may subsequently reorient the apparatus. In such an example, the apparatus may determine a second display angle of a display, and determine a second menu item of the array of menu items based, at least in part, on the second display angle. In order to continue to provide a user with a comprehendible and upright user interface, in such an example, a second operation may comprise modification of the orientation of the plurality of representations of array elements such that the orientation of each representation of the plurality of representations on the display corresponds with the second display angle.

Figure 5B:
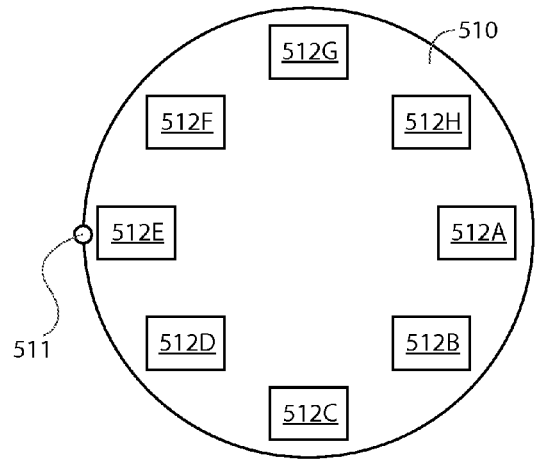

FIG. 5B is a diagram illustrating an array of menu items according to at least one example embodiment. The example of FIG. 5B depicts display 510, having bottom 511, displaying representations 512A-512H. In the example of FIG. 5B, each of representations 512A-512H represent a menu item of an array of menu items. In this manner, in the example of FIG. 5B, display 510 is displaying a plurality of representations of menu items of an array of menu items. In the example of FIG. 5B, display 510 is oriented such that bottom 501 fails to be at the bottom of display 510. As such, display 510 may fail to be oriented in an upright orientation, in a predetermined default orientation, and/or the like. As such, the display angle of display 510 may be 90-degrees. Similarly, the angular change between the display angle of display 500 in FIG. 5A and display 510 may be clockwise 90-degrees, positive 90-degrees, and/or the like. As can be seen in the example of FIG. 5B, each of representations 512A-512H is displayed such that the orientation of each of representations 512A-512H is based, at least in part, on the display angle of display 510. In this manner, each of representations 512A-512H is perceived by a viewer of display 510 to be upright, to be easily comprehendible, and/or the like, regardless of the fact that display 510 is rotated 90-degrees from its upright orientation, predetermined default orientation, and/or the like.

In some circumstances, a user may desire to interact with information by way of one or more menu items. In such circumstances, the user may desire to perceive information associated with selection of a menu item. For example, the user may desire to indicate selection of a menu item by way of orienting a display at a particular display angle that corresponds with a position of a representation of the menu item, and desire to perceive information associated with selection of the menu item to be displayed on the display, to cause modification to information that was displayed on the display prior to such a selection, and/or the like. As such, it may be desirable to configure an apparatus such that the apparatus displays additional information associated with a particular menu item, is caused to display additional information based, at least in part, on selection of a particular menu item, and/or the like. In at least one example embodiment, an operation comprises display of a representation of additional information on the display. In such an example embodiment, the representation of the additional information may be displayed on a portion of the display, on the entirety of the display, in a center portion of the display, and/or the like. In such an example embodiment, in order to provide a user with an upright user interface, the representation of the additional information may be displayed such that the orientation of the representation of the additional information corresponds with a display angle of the display. For example, a user may indicate selection of a first menu item by way of orienting an apparatus at a first display angle that corresponds with the first menu item. In such an example, the apparatus may perform a first operation that comprises display, in a center portion of the display, of a representation of additional information that is associated with the first menu item such that the orientation of the representation of the additional information corresponds with the first display angle. In such an example, the user may subsequently reorient the apparatus to indicate selection of a second menu item by way of orienting the display at a second display angle that corresponds with the second menu item. In such an example, the apparatus may perform a second operation that comprises display, in a center portion of the display, of a representation of additional information that is associated with the second menu item such that the orientation of the representation of additional information corresponds with the second display angle.

As previously discussed, in some circumstances, a user may desire to interact with particular software associated with an apparatus, to utilize software to facilitate performance of one or more tasks, to view information associated with a particular program, and/or the like. In such circumstances, it may be desirable to configure an apparatus such that the user of the apparatus may indicate a desire to invoke a particular program in an easy and intuitive manner. In at least one example embodiment, an array is an array of program identifiers. In such an example embodiment, an array element of the array of program identifiers may be a program identifier. For example, a first array element may be a first program identifier, a second array element may be a second program identifier, and/or the like. In such circumstances, a user may desire to indicate selection of the first program identifier, of the second program identifier, and/or the like. As discussed previously, the user may desire to indicate selection of a particular program identifier based, at least in part, on a position of the program identifier and a display angle of the display of the apparatus. For example, a user may indicate selection of a particular program identifier of the array of program identifiers by way of orienting the display such that the display angle of the display corresponds with a position of a representation of the program identifier on the display. In at least one example embodiment, an apparatus causes display of a plurality of representations of program identifier such that a representation of a first program identifier is displayed at a position that corresponds with a first display angle and a representation of a second program identifier is displayed at a position that corresponds with a second display angle. In such an example embodiment, a user may indicate a desire to invoke a program associated with the first program identifier by way of orienting the display at the first display angle, a desire to invoke a program associated with the second program identifier by way of orienting the display at the second display angle, and/or the like.

Figure 5C:
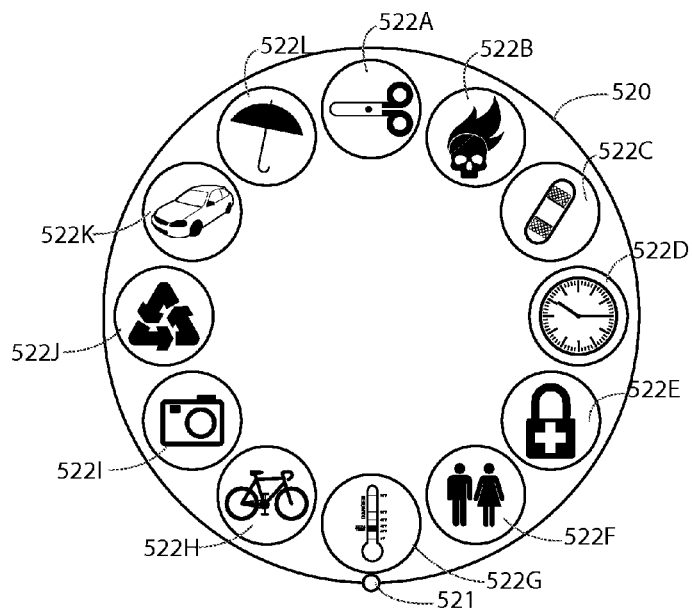

FIG. 5C is a diagram illustrating an array of program identifiers according to at least one example embodiment. The example of FIG. 5C depicts display 520, having bottom 521, displaying representations 522A-522L. In the example of FIG. 5C, each of representations 522A-522L represent a program identifier of an array of program identifiers. In this manner, in the example of FIG. 5C, display 520 is displaying a plurality of representations of program identifier of an array of program identifiers. In the example of FIG. 5C, display 520 is oriented such that bottom 521 is at the bottom of display 520. As such, display 520 may be oriented in an upright orientation, in a predetermined default orientation, and/or the like, such that a display angle of display 520 is 0-degrees. As can be seen in the example of FIG. 5C, each of representations 522A-522L is displayed such that the orientation of each of representations 522A-522L is based, at least in part, on the display angle of display 520. In this manner, each of representations 522A-522L is perceived by a viewer of display 520 to be upright, to be easily comprehendible, and/or the like.

As discussed previously, in some circumstances, a user may desire to interact with information associated with a particular program, by way of specific software, and/or the like. In such circumstances, the user may desire to perceive information associated with a particular program that is identified by a program identifier. For example, the user may desire to invoke a particular program by way of orienting a display at a particular display angle that corresponds with a position of a representation of a program identifier that identifies the particular program, and desire to perceive information associated with the particular program to be displayed on the display, to cause modification to information that was displayed on the display prior to such a selection, and/or the like. As such, it may be desirable to configure an apparatus such that the apparatus displays visual information associated with a particular program, is caused to display visual information based, at least in part, on invocation of the particular program, and/or the like. In at least one example embodiment, an operation comprises display of visual information on the display. In such an example embodiment, the visual information may be displayed on a portion of the display, on the entirety of the display, in a center portion of the display, and/or the like. In such an example embodiment, the visual information may be caused to be display by a program that has been invoked by way of selection of the program identifier that identifies the program. In such an example embodiment, in order to provide a user with an upright user interface, the visual information may be displayed such that the orientation of the visual information corresponds with a display angle of the display. For example, a user may indicate a desire to cause invocation of a first program by way of orienting an apparatus at a first display angle that corresponds with a first program identifier that identifies the first program. In such an example, the apparatus may perform a first operation that comprises display, in a center portion of the display, of visual information that is caused to be displayed by the first program such that the orientation of the visual information corresponds with the first display angle. In such an example, the user may subsequently reorient the apparatus to indicate a desire to cause invocation of a second program by way of orienting the display at a second display angle that corresponds with a second program identifier that identifies the second program. In such an example, the apparatus may perform a second operation that comprises display, in a center portion of the display, of visual information that is caused to be displayed by the second program such that the orientation of the visual information corresponds with the second display angle. In such an example, the second operation may comprise preclusion of display of visual information by the first program, termination of display of the visual information caused to be displayed by the first program, modification of display of the visual information caused to be displayed by the first program and/or the like. In this manner, invocation of a particular program may provide the particular program with control over display of visual information in a portion of the display, such as a center portion of the display, a top portion of the display, a side portion of the display, and/or the like.

Figure 5D:
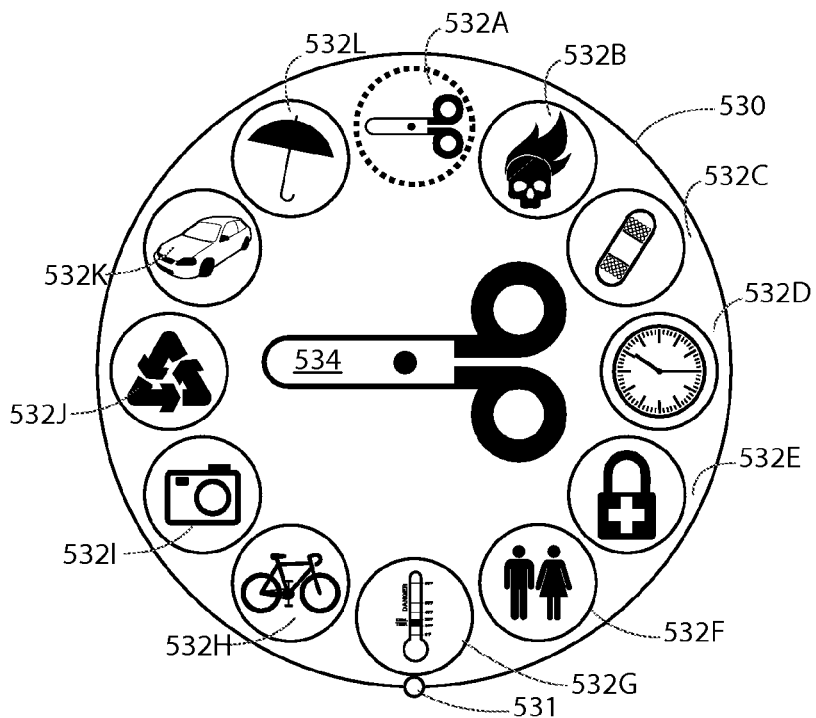

FIG. 5D is a diagram illustrating an array of program identifiers according to at least one example embodiment. The example of FIG. 5D depicts display 530, having bottom 531, displaying representations 532A-532L. In the example of FIG. 5D, each of representations 532A-532L represent a program identifier of an array of program identifiers. In this manner, in the example of FIG. 5D, display 530 is displaying a plurality of representations of program identifier of an array of program identifiers. In the example of FIG. 5D, display 530 is oriented such that bottom 531 is at the bottom of display 530. As such, display 530 may be oriented in an upright orientation, in a predetermined default orientation, and/or the like, such that a display angle of display 530 is 0-degrees. As can be seen in the example of FIG. 5D, each of representations 532A-532L is displayed such that the orientation of each of representations 532A-532L is based, at least in part, on the display angle of display 530. In this manner, each of representations 532A-532L is perceived by a viewer of display 530 to be upright, to be easily comprehendible, and/or the like.

As can be seen in the example of FIG. 5D, representation 532A is outlined in a bold dashed line. Such an indication may indicate that a program associated with the program identifier represented by representation 532A has been invoked. As can be see, display 530 is displaying visual information 534 in a center portion of display 530. In the example of FIG. 5D, the visual information is visual information associated with the program associated with the program identifier represented by representation 532A, is visual information caused to be displayed by the program associated with the program identifier represented by representation 532A, and/or the like. As can be seen in the example of FIG. 5D, the visual information is displayed such that the orientation of the visual information is based, at least in part, on the display angle of display 530. In this manner, the visual information is perceived by a view of display 530 to be upright, to be easily comprehendible, and/or the like.

As described previously, in many circumstances, a user may be interacting with information while the user is peering at a display of the apparatus. For example, the user may be interacting with an array of program identifiers by way of reorienting the display of the apparatus to a display angle, from a different display angle, and/or the like. In such circumstances, it may be desirable to configure the apparatus such that information displayed on the display remains in an upright orientation while the user of the apparatus rolls, spins, twists, and/or the like, the apparatus. For example, it may be desirable to ensure that user interface elements, such as a plurality of representations of program identifier are displayed such that each representation is displayed in an upright orientation regardless of an orientation of the apparatus, of the display, and/or the like. As such, it may be desirable to display a representation of an array element based, at least in part, on an orientation of the apparatus, a display angle of the display, and/or the like, with respect to gravity. For example, an apparatus may display a plurality of representations of program identifier of an array of program identifiers, determine a first display angle of a display comprised by the apparatus, and determine a first program identifier of the array of menu items based, at least in part, on the first display angle. In order to provide a user with a comprehendible and upright user interface, in such an example, a first operation may comprise modification of orientation of the plurality of representations of program identifiers such that an orientation of each representation of the plurality of representations of program identifiers on the display corresponds with the first display angle. In this manner, each representation of the plurality of representations of program identifiers may be displayed in an upright orientation such that the representations are easily comprehendible by the user. In such an example, the user may subsequently reorient the apparatus. In such an example, the apparatus may determine a second display angle of a display, and determine a second program identifier of the array of program identifiers based, at least in part, on the second display angle. In order to continue to provide a user with a comprehendible and upright user interface, in such an example, a second operation may comprise modification of the orientation of the plurality of representations of program identifiers such that the orientation of each representation of the plurality of representations of program identifiers on the display corresponds with the second display angle.

Figure 5E:
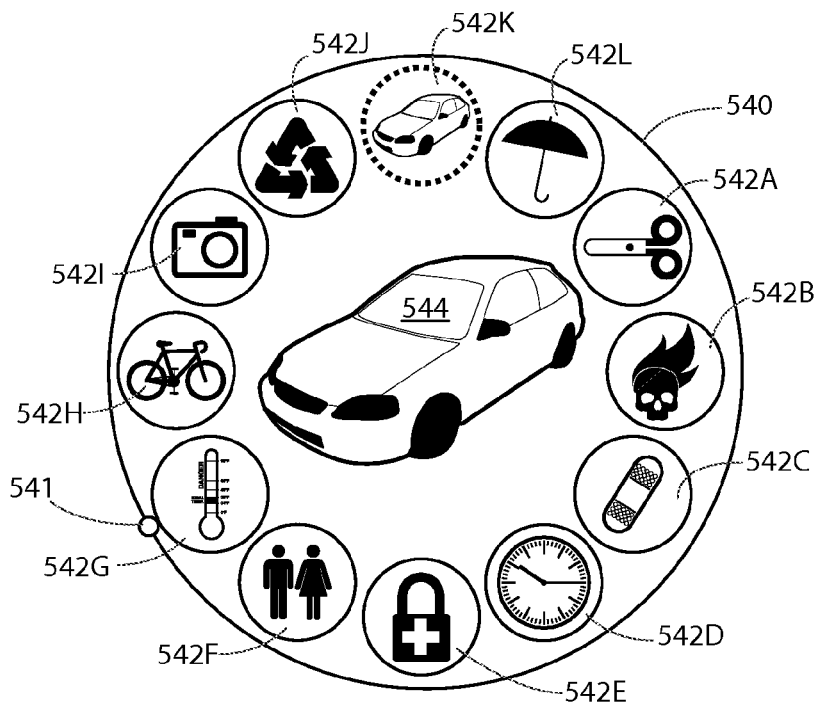

FIG. 5E is a diagram illustrating an array of program identifiers according to at least one example embodiment. The example of FIG. 5E depicts display 540, having bottom 541, displaying representations 542A-542L. In the example of FIG. 5E, each of representations 542A-542L represent a program identifier of an array of program identifiers. In this manner, in the example of FIG. 5E, display 540 is displaying a plurality of representations of program identifier of an array of program identifiers. In the example of FIG. 5E, display 540 is oriented such that bottom 541 fails to be at the bottom of display 540. As such, display 540 may fail to be oriented in an upright orientation, in a predetermined default orientation, and/or the like. In the example of FIG. 5E, display 540 has a display angle of 60-degrees, as the display is oriented 60-degrees from an upright orientation of the display, a predetermined default orientation of the display, and/or the like. For example, display 540 may correspond with display 530 of FIG. 5D. In such an example, display 540 may have been reoriented such that display 540 is oriented at an orientation that is 60-degrees rotated from the orientation of display 530. In this manner, an angular change between the display angle of display 530 of FIG. 5D and the display angle of display 540 may be positive 60-degrees, clockwise 60-degrees, decrementing 60-degrees, and/or the like.

As can be seen in the example of FIG. 5E, each of representations 542A-542L is displayed such that the orientation of each of representations 542A-542L is based, at least in part, on the display angle of display 540. In this manner, each of representations 542A-542L may be perceived by a viewer of display 540 to be upright, to be easily comprehendible, and/or the like.

As can be seen in the example of FIG. 5E, representation 542K is outlined in a bold dashed line. Such an indication may indicate that a program associated with the program identifier represented by representation 542K has been invoked. As can be see, display 540 is displaying visual information 544 in a center portion of display 540. In the example of FIG. 5E, the visual information is visual information associated with the program associated with the program identifier represented by representation 542K, is visual information caused to be displayed by the program associated with the program identifier represented by representation 542K, and/or the like. As can be seen in the example of FIG. 5E, the visual information is displayed such that the orientation of the visual information is based, at least in part, on the display angle of display 540. In this manner, the visual information is perceived by a view of display 540 to be upright, to be easily comprehendible, and/or the like.

Figures 6A, 6B, 6C:
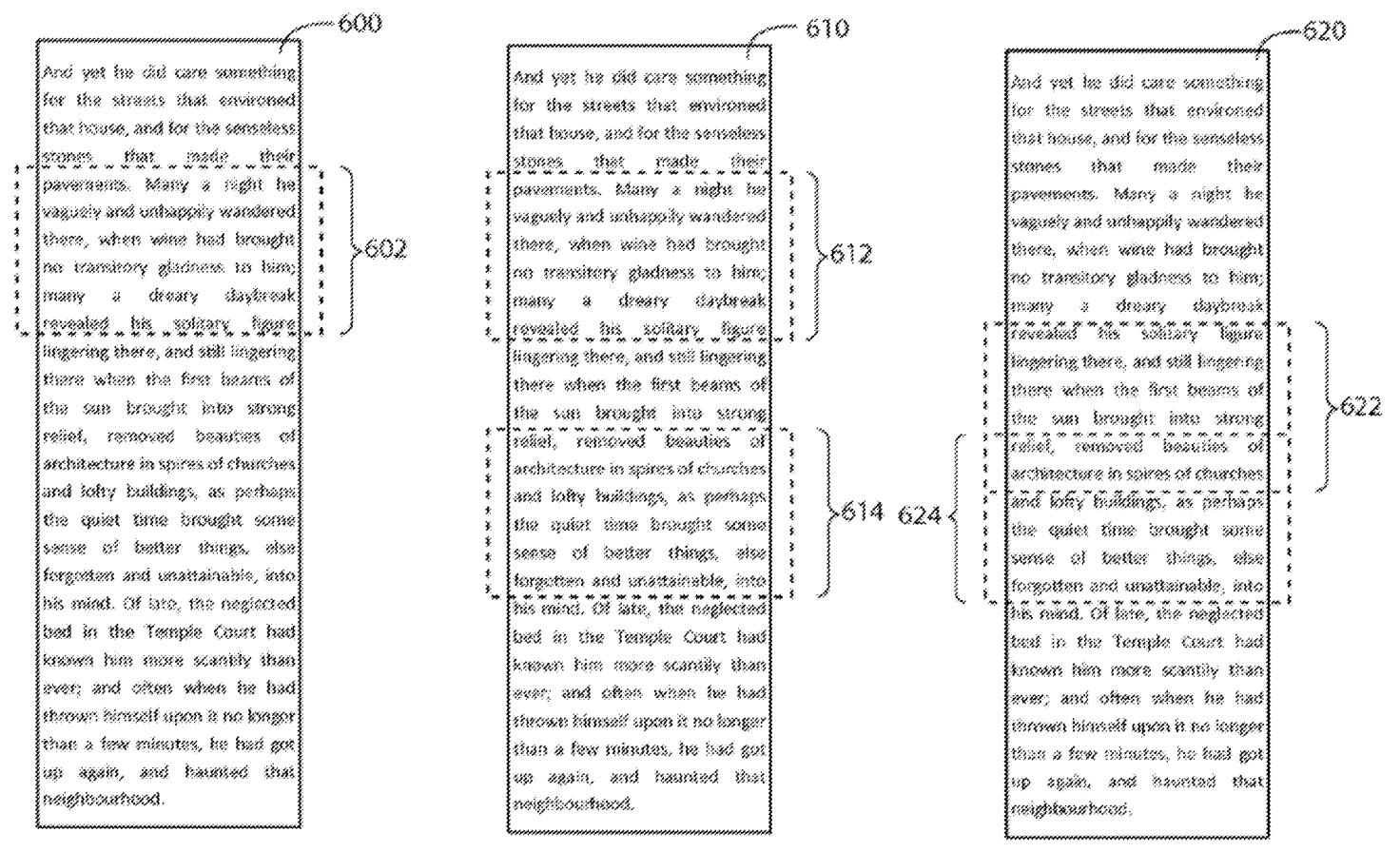

FIGS. 6A-6C are diagrams illustrating a virtual screen of information according to at least one example embodiment. The examples of FIGS. 6A-6C are merely examples and do not limit the scope of the claims. For example, virtual screen of information configuration and/or orientation may vary, virtual screen of information size and/or count may vary, region configuration and/or orientation may vary, region size and/or count may vary, and/or the like.

As discussed previously, in many circumstances, a user may desire to view information that is displayed on a display of an apparatus. In many circumstances, a display of an apparatus may have different dimensions than the information to be displayed on the display. For example, the display may be dimensioned such that the display may be unable to display the entirety of the information that the user desires to view, interact with, and/or the like. In such an example, the content may be too large, too long, and/or the like. In such an example, it may be desirable to configure an apparatus such that a user of the apparatus may view and/or interact with the entirety of the content by way of panning, scrolling, moving, and/or the like, within a virtual screen. In at least one example embodiment, a virtual screen is a screen that is characterized by an area that is larger than an area of a display on which the virtual screen is displayed. In such an example embodiment, a portion of the virtual screen may be displayed at a given time on the display. Panning, scrolling, moving, and/or the like, within the virtual screen may cause displaying of a different portion of the virtual screen on the display. For example, the virtual screen may comprise visual information indicative of a map. In such an example, a user may desire to pan horizontally, vertically, diagonally, and/or the like, within the virtual screen such that the user may perceive various portions of the map that may be displayed on a display. In another example, the virtual screen may comprise a document of two pages. In such an example, the display may be dimensioned such that only one half of one page may be displayed. In such an example, the user may pan horizontally, vertically, diagonally, and/or the like, within the virtual screen such that the user may perceive the entirety of the document by way of at viewing at least four half-page regions of the document comprised by the virtual screen.

FIG. 6A is a diagram illustrating a virtual screen of information according to at least one example embodiment. The example of FIG. 6A depicts virtual screen 600 comprising region 602. As can be seen, region 602 comprises a portion of the information comprised by virtual screen 600. Although the example of FIG. 6A depicts textual information, virtual screen 600 may comprise any type of information, such as graphical information, video information, textual information, and/or the like. Although the example of FIG. 6A depicts virtual screen 600 as a rectangular area in a vertical orientation, virtual screen 600 may be configured in any shape, such as abstract, circular, and/or the like, and in any orientation, such as a horizontal orientation, a diagonal orientation, and/or the like. Although the example of FIG. 6A depicts region 602 as a square region spanning the entirety of the width of virtual screen 600, the size of region 602 may vary, the shape of region 602 may vary, and/or the like.

FIG. 6B is a diagram illustrating a virtual screen of information according to at least one example embodiment. The example of FIG. 6B depicts virtual screen 610 comprising regions 612 and 614. As can be seen, region 612 comprises a portion of the information comprised by virtual screen 610, and region 614 comprises a different portion of the information comprised by virtual screen 610. As can be see, region 612 fails to comprise any information comprised by region 614. In the example of FIG. 6B, a user may have oriented a display of an apparatus such that the display was at a first display angle that indicated selection of the region 612 of virtual screen 610 and, subsequently, oriented the display of the apparatus such that the display was at a second display angle that indicated selection of the region 614 of virtual screen 610. For example, the user may have rotated the display 30-degrees clockwise, 25-degrees counter-clockwise, and/or the like. In such an example, the difference between the position of region 612 within virtual screen 610 and the position of region 614 within virtual screen 610 may be proportional to the magnitude of the angular change between the first display angle and the second display angle.

FIG. 6C is a diagram illustrating a virtual screen of information according to at least one example embodiment. FIG. 6C is a diagram illustrating a virtual screen of information according to at least one example embodiment. The example of FIG. 6C depicts virtual screen 620 comprising regions 622 and 624. As can be seen, region 622 comprises a portion of the information comprised by virtual screen 620, and region 624 comprises a portion of the information comprised by virtual screen 620. As can be see, region 622 comprises a portion of the information comprised by region 624. In the example of FIG. 6C, a user may have oriented a display of an apparatus such that the display was at a first display angle that indicated selection of the region 622 of virtual screen 620 and, subsequently, oriented the display of the apparatus such that the display was at a second display angle that indicated selection of the region 624 of virtual screen 620. For example, the user may have rotated the display 15-degrees clockwise, 17-degrees counter-clockwise, and/or the like. In such an example, the difference between the position of region 622 within virtual screen 620 and the position of region 624 within virtual screen 620 may be proportional to the magnitude of the angular change between the first display angle and the second display angle. As can be seen, the difference in the positions of regions 622 and 624 is less than the different in the positions of regions 612 and 614 of FIG. 6B. In this manner, the magnitude of the angular change represented in FIG. 6C may be less than the magnitude of the angular change represented in FIG. 6B.

As such, it may be desirable to configure an apparatus such that a user of the apparatus may pan, scroll, move, and/or the like, within the virtual screen in an easy and intuitive manner. For example, it may be desirable to configure the apparatus such that the user may pan, scroll, move, and/or the like, within the virtual screen by way of reorienting the display of the apparatus at various display angles. In at least one example embodiment, a sequential arrangement of information is a virtual screen of information. In such an example embodiment, a contiguous subset of the virtual screen may be a region of the virtual screen. In this manner, a user may indicate a desire to perceive a first region of a virtual screen by way of orienting the display at a first display angle, may indicate a desire to perceive a second region of the virtual screen by way of orienting the display at a second display angle, and/or the like. In this manner, the virtual screen may be panned across, scrolled, moved within, and/or the like, based, at least in part, on the first display angle, the second display angle, the angular change between the first display angle and the second display angle, the magnitude of the angular change, the direction of the angular change, and/or the like. In order to facilitate perception of the various regions of the virtual screen by the user, it may be desirable to cause display of the various regions of the virtual screen based, at least in part, on the user rolling, rotating, and/or the like, the display, the apparatus, and/or the like. In at least one example embodiment, an apparatus performs an operation that comprises display of a region of a virtual screen on a display. For example, a user may orient the display at a first display angle, the apparatus may determine a first region of the virtual screen based, at least in part, on the first display angle, and the apparatus may display the first region of the virtual screen on the display. Subsequently, the user may desire to perceive a different region of the virtual screen, and may orient the display at a second display angle, the apparatus may determine a second region of the virtual screen based, at least in part, on the second display angle, and the apparatus may display the second region of the virtual screen on the display. In such an example, the second operation may comprise termination of display of the first region of the virtual screen prior to the display of the second region of the virtual screen, modification of the display of the first region of the virtual screen prior to the display of the second region of the virtual screen, and/or the like.

As discussed previously, in many circumstances, it may be desirable for an apparatus to display information such that the information is perceived as being in an upright orientation from the perspective of a user of the apparatus. As such, in at least one example embodiment, the display of a region of a virtual screen is performed such that the orientation of the region of the virtual screen on the display corresponds with a display angle of a display. For example, a user may orient the display at a first display angle, the apparatus may determine a first region of the virtual screen based, at least in part, on the first display angle, and the apparatus may display the first region of the virtual screen on the display such that the orientation of the first region of the virtual screen on the display corresponds with the first display angle. Subsequently, the user may desire to perceive a different region of the virtual screen, and may orient the display at a second display angle, the apparatus may determine a second region of the virtual screen based, at least in part, on the second display angle, and the apparatus may display the second region of the virtual screen on the display such that the orientation of the second region of the virtual screen on the display corresponds with the second display angle.

Figure 7:
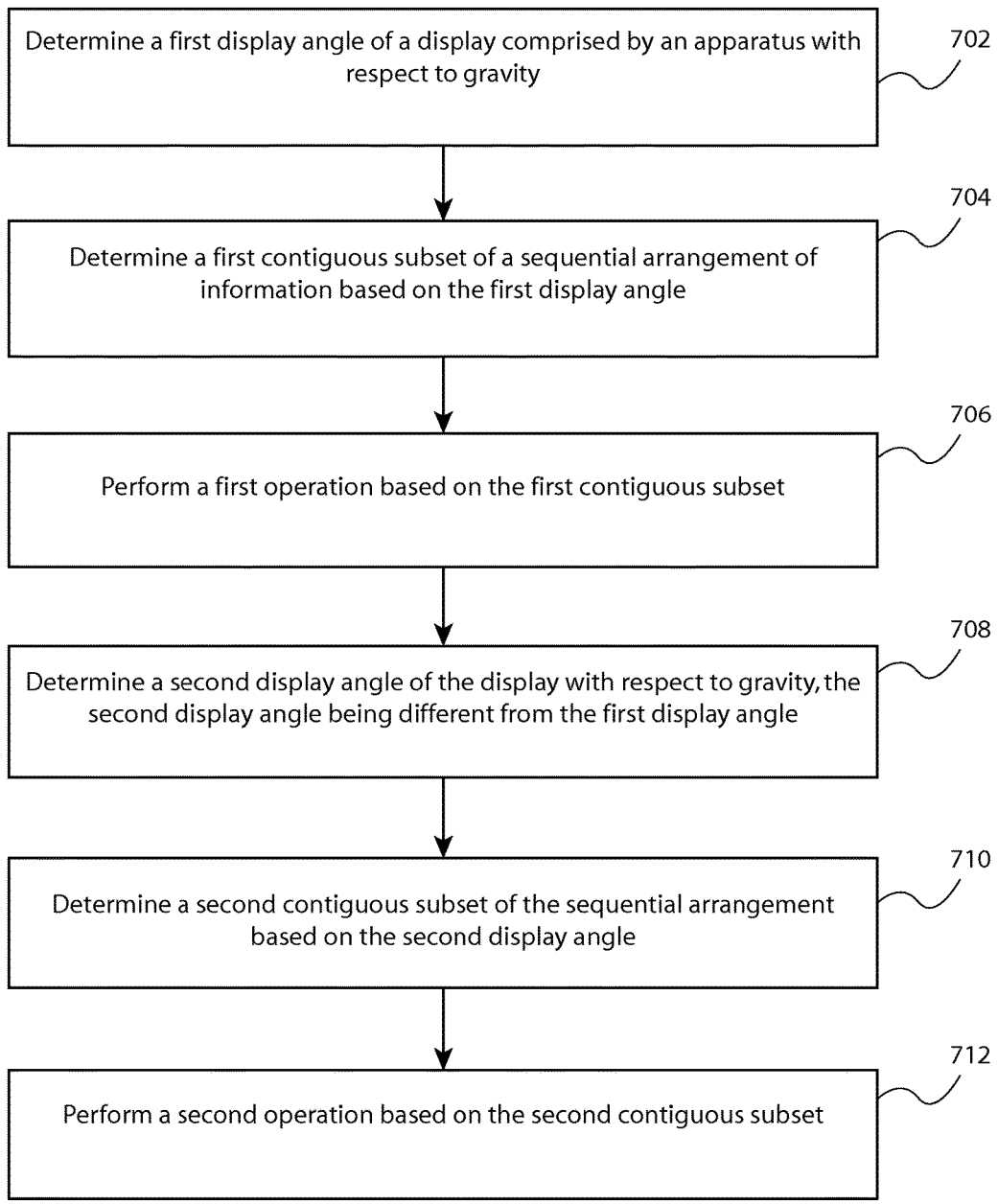
FIG. 7 is a flow diagram illustrating activities associated with determination of a contiguous subset of a sequential arrangement of information based, at least in part, on a display angle of a display according to at least one example embodiment.

FIG. 7 is a flow diagram illustrating activities associated with determination of a contiguous subset of a sequential arrangement of information based, at least in part, on a display angle of a display according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines a first display angle of a display comprised by an apparatus with respect to gravity. The determination, the first display angle, the display, and the apparatus may be similar as described regarding FIGS. 2A-2F and FIGS. 3A-3C.

At block 704, the apparatus determines a first contiguous subset of a sequential arrangement of information based, at least in part, on the first display angle. The determination, the first contiguous subset, and the sequential arrangement of information may be similar as described regarding FIGS. 3A-3C, FIGS. 4A-4C, FIGS. 5A-5E, and FIGS. 6A-6C.

At block 706, the apparatus performs a first operation based, at least in part, on the first contiguous subset. The performance and the first operation may be similar as described regarding FIGS. 4A-4C, FIGS. 5A-5E, and FIGS. 6A-6C.

At block 708, the apparatus determines a second display angle of the display with respect to gravity, the second display angle being different from the first display angle. The determination and the second display angle may be similar as described regarding FIGS. 2A-2F and FIGS. 3A-3C.

At block 710, the apparatus determines a second contiguous subset of the sequential arrangement based, at least in part, on the second display angle. The determination and the second contiguous subset may be similar as described regarding FIGS. 3A-3C, FIGS. 4A-4C, FIGS. 5A-5E, and FIGS. 6A-6C.

At block 712, the apparatus performs a second operation based, at least in part, on the second contiguous subset. The performance and the second operation may be similar as described regarding FIGS. 4A-4C, FIGS. 5A-5E, and FIGS. 6A-6C.

Figure 8:
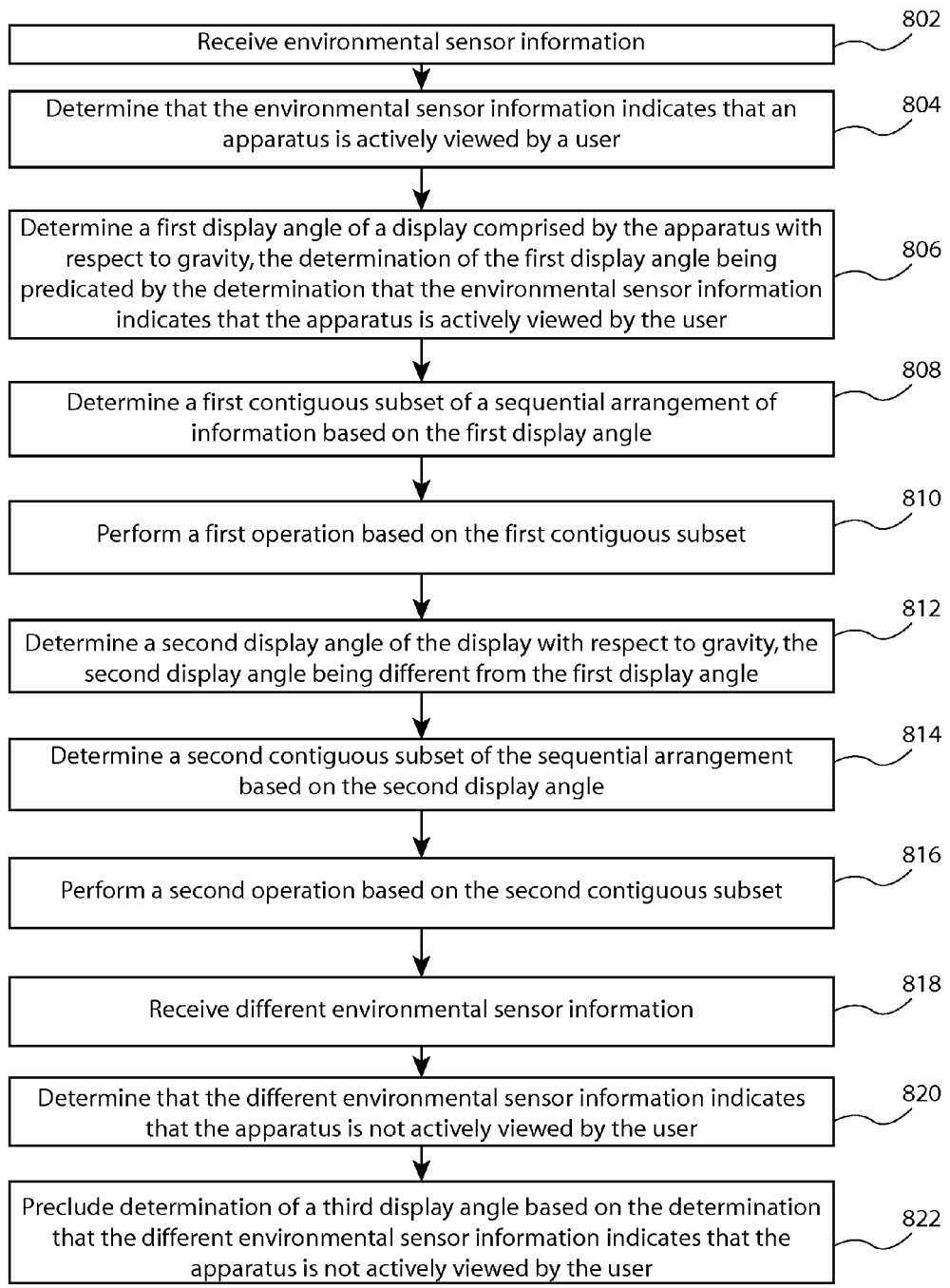
FIG. 8 is a flow diagram illustrating activities associated with determination of a contiguous subset of a sequential arrangement of information based, at least in part, on a display angle of a display according to at least one example embodiment.

FIG. 8 is a flow diagram illustrating activities associated with determination of a contiguous subset of a sequential arrangement of information based, at least in part, on a display angle of a display according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives environmental sensor information. The receipt and the environmental sensor information may be similar as described regarding FIGS. 2A-2F.

At block 804, the apparatus determines that the environmental sensor information indicates that the apparatus is actively viewed by a user. The determination and the apparatus being actively viewed by the user may be similar as described regarding FIGS. 2A-2F.

At block 806, the apparatus determines a first display angle of a display comprised by the apparatus with respect to gravity. In at least one example embodiment, the determination of the first display angle is predicated by the determination that the environmental sensor information indicates that the apparatus is actively viewed by the user. The determination, the first display angle, and the display may be similar as described regarding FIGS. 2A-2F and FIGS. 3A-3C.

At block 808, the apparatus determines a first contiguous subset of a sequential arrangement of information based, at least in part, on the first display angle. The determination, the first contiguous subset, and the sequential arrangement of information may be similar as described regarding FIGS. 3A-3C, FIGS. 4A-4C, FIGS. 5A-5E, and FIGS. 6A-6C.

At block 810, the apparatus performs a first operation based, at least in part, on the first contiguous subset. The performance and the first operation may be similar as described regarding FIGS. 4A-4C, FIGS. 5A-5E, and FIGS. 6A-6C.

At block 812, the apparatus determines a second display angle of the display with respect to gravity, the second display angle being different from the first display angle. The determination and the second display angle may be similar as described regarding FIGS. 2A-2F and FIGS. 3A-3C.

At block 814, the apparatus determines a second contiguous subset of the sequential arrangement based, at least in part, on the second display angle. The determination and the second contiguous subset may be similar as described regarding FIGS. 3A-3C, FIGS. 4A-4C, FIGS. 5A-5E, and FIGS. 6A-6C.

At block 816, the apparatus performs a second operation based, at least in part, on the second contiguous subset. The performance and the second operation may be similar as described regarding FIGS. 4A-4C, FIGS. 5A-5E, and FIGS. 6A-6C.

At block 818, the apparatus receives different environmental sensor information. The receipt and the different environmental sensor information may be similar as described regarding FIGS. 2A-2F.

At block 820, the apparatus determines that the different environmental sensor information indicates that the apparatus is not actively viewed by the user. The determination and the apparatus being not actively viewed by the user may be similar as described regarding FIGS. 2A-2F.

At block 822, the apparatus precludes determination of a third display angle based, at least in part, on the determination that the different environmental sensor information indicates that the apparatus is not actively viewed by the user. The preclusion of determination and the third display angle may be similar as described regarding FIGS. 2A-2F and FIGS. 3A-3C.

Figure 9:
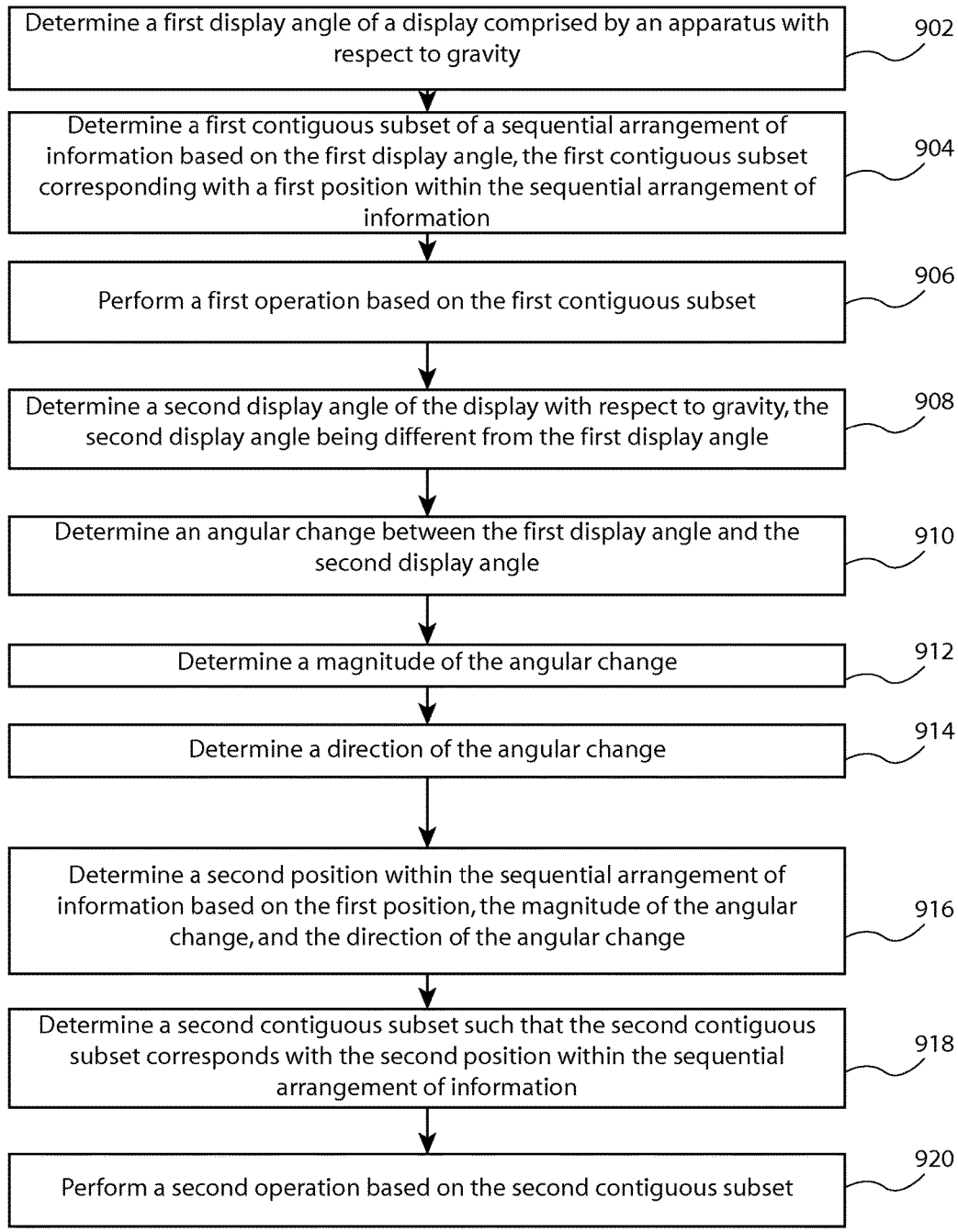
FIG. 9 is a flow diagram illustrating activities associated with determination of a contiguous subset of a sequential arrangement of information based, at least in part, on a display angle of a display according to at least one example embodiment.

FIG. 9 is a flow diagram illustrating activities associated with determination of a contiguous subset of a sequential arrangement of information based, at least in part, on a display angle of a display according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In some circumstances, as discussed previously, it may be desirable to determine a contiguous subset of a sequential arrangement of information based, at least in part, on a magnitude of an angular change and/or a direction of an angular change between a first display angle and a second display angle.

At block 902, the apparatus determines a first display angle of a display comprised by an apparatus with respect to gravity. The determination, the first display angle, the display, and the apparatus may be similar as described regarding FIGS. 2A-2F and FIGS. 3A-3C.

At block 904, the apparatus determines a first contiguous subset of a sequential arrangement of information based, at least in part, on the first display angle. In at least one example embodiment, the first contiguous subset corresponds with a first position within the sequential arrangement of information. The determination, the first contiguous subset, the sequential arrangement of information, and the first position within the sequential arrangement of information may be similar as described regarding FIGS. 3A-3C, FIGS. 4A-4C, FIGS. 5A-5E, and FIGS. 6A-6C.

At block 906, the apparatus performs a first operation based, at least in part, on the first contiguous subset. The performance and the first operation may be similar as described regarding FIGS. 4A-4C, FIGS. 5A-5E, and FIGS. 6A-6C.

At block 908, the apparatus determines a second display angle of the display with respect to gravity, the second display angle being different from the first display angle. The determination and the second display angle may be similar as described regarding FIGS. 2A-2F and FIGS. 3A-3C.

At block 910, the apparatus determines an angular change between the first display angle and the second display angle. The determination and the angular change may be similar as described regarding FIGS. 3A-3C.

At block 912, the apparatus determines a magnitude of the angular change. The determination and the magnitude of the angular change may be similar as described regarding FIGS. 3A-3C.

At block 914, the apparatus determines a direction of the angular change. The determination and the direction of the angular change may be similar as described regarding FIGS. 3A-3C.

At block 916, the apparatus determines a second position within the sequential arrangement of information based, at least in part, on the first position, the magnitude of the angular change, and the direction of the angular change. The determination and the second position within the sequential arrangement of information may be similar as described regarding FIGS. 3A-3C, FIGS. 4A-4C, FIGS. 5A-5E, and FIGS. 6A-6C.

At block 918, the apparatus determines a second contiguous subset of the sequential arrangement such that the second contiguous subset corresponds with the second position within the sequential arrangement of information. The determination and the second contiguous subset may be similar as described regarding FIGS. 3A-3C, FIGS. 4A-4C, FIGS. 5A-5E, and FIGS. 6A-6C.

At block 920, the apparatus performs a second operation based, at least in part, on the second contiguous subset. The performance and the second operation may be similar as described regarding FIGS. 4A-4C, FIGS. 5A-5E, and FIGS. 6A-6C.

Figure 10:
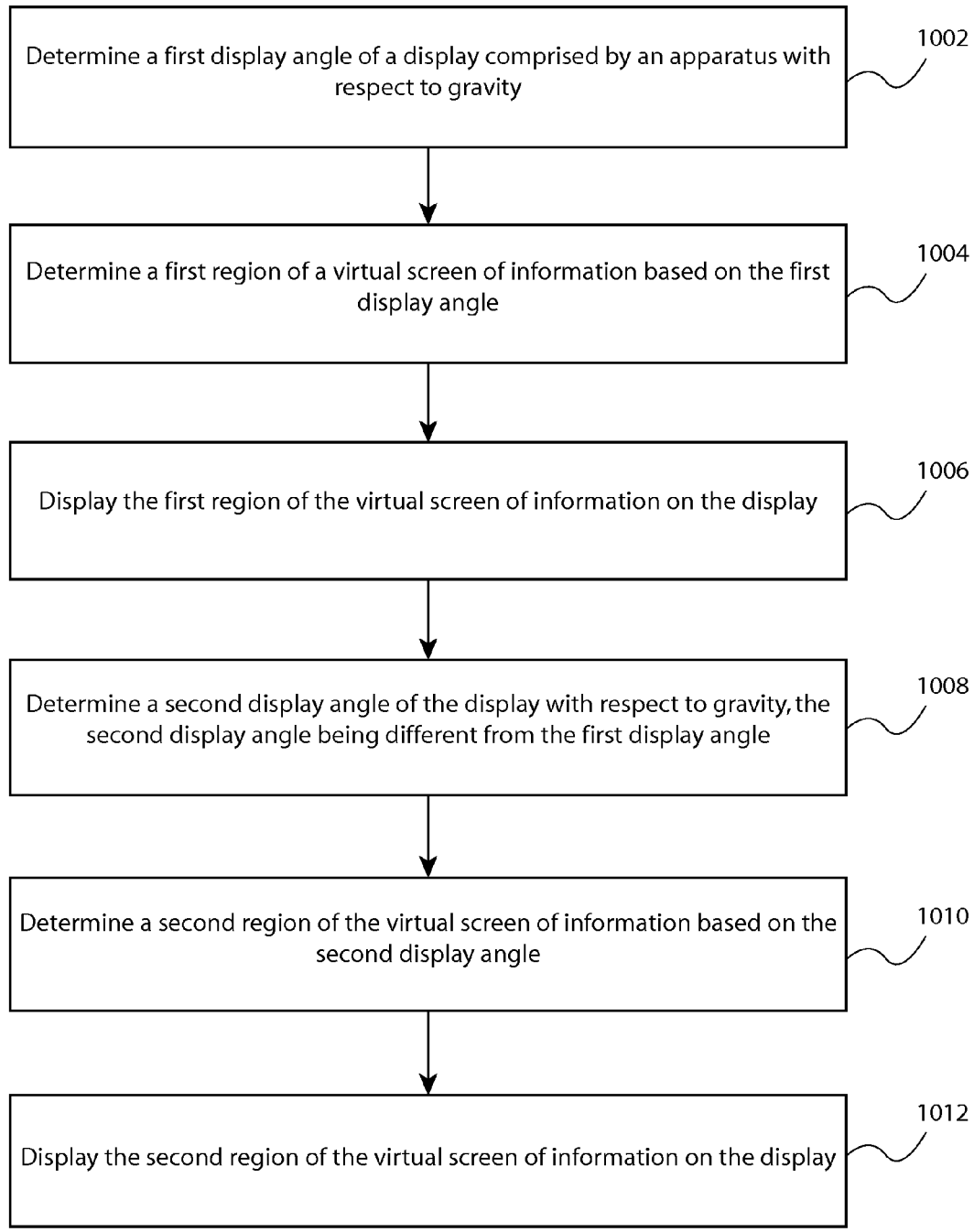
FIG. 10 is a flow diagram illustrating activities associated with determination of a region of a virtual screen of information based, at least in part, on a display angle of a display according to at least one example embodiment.

FIG. 10 is a flow diagram illustrating activities associated with determination of a region of a virtual screen of information based, at least in part, on a display angle of a display according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in some circumstances, it may be desirable to display a region of a virtual screen of information on a display based, at least in part, on a display angle of the display.

At block 1002, the apparatus determines a first display angle of a display comprised by an apparatus with respect to gravity. The determination, the first display angle, the display, and the apparatus may be similar as described regarding FIGS. 2A-2F and FIGS. 3A-3C.

At block 1004, the apparatus determines a first region of a virtual screen of information based, at least in part, on the first display angle. The determination, the first region, and the virtual screen of information may be similar as described regarding FIGS. 3A-3C, FIGS. 4A-4C, FIGS. 5A-5E, and FIGS. 6A-6C.

At block 1006, the apparatus displays the first region of the virtual screen of information on the display. The display of the first region of the virtual screen of information on the display may be similar as described regarding FIGS. 2A-2F and FIGS. 6A-6C.

At block 1008, the apparatus determines a second display angle of the display with respect to gravity, the second display angle being different from the first display angle. The determination and the second display angle may be similar as described regarding FIGS. 2A-2F and FIGS. 3A-3C.

At block 1010, the apparatus determines a second region of the virtual screen of information based, at least in part, on the second display angle. The determination and the second region may be similar as described regarding FIGS. 3A-3C, FIGS. 4A-4C, FIGS. 5A-5E, and FIGS. 6A-6C.

At block 1012, the apparatus displays the second region of the virtual screen of information on the display. The display of the second region of the virtual screen of information on the display may be similar as described regarding FIGS. 2A-2F and FIGS. 6A-6C.

Figure 11:
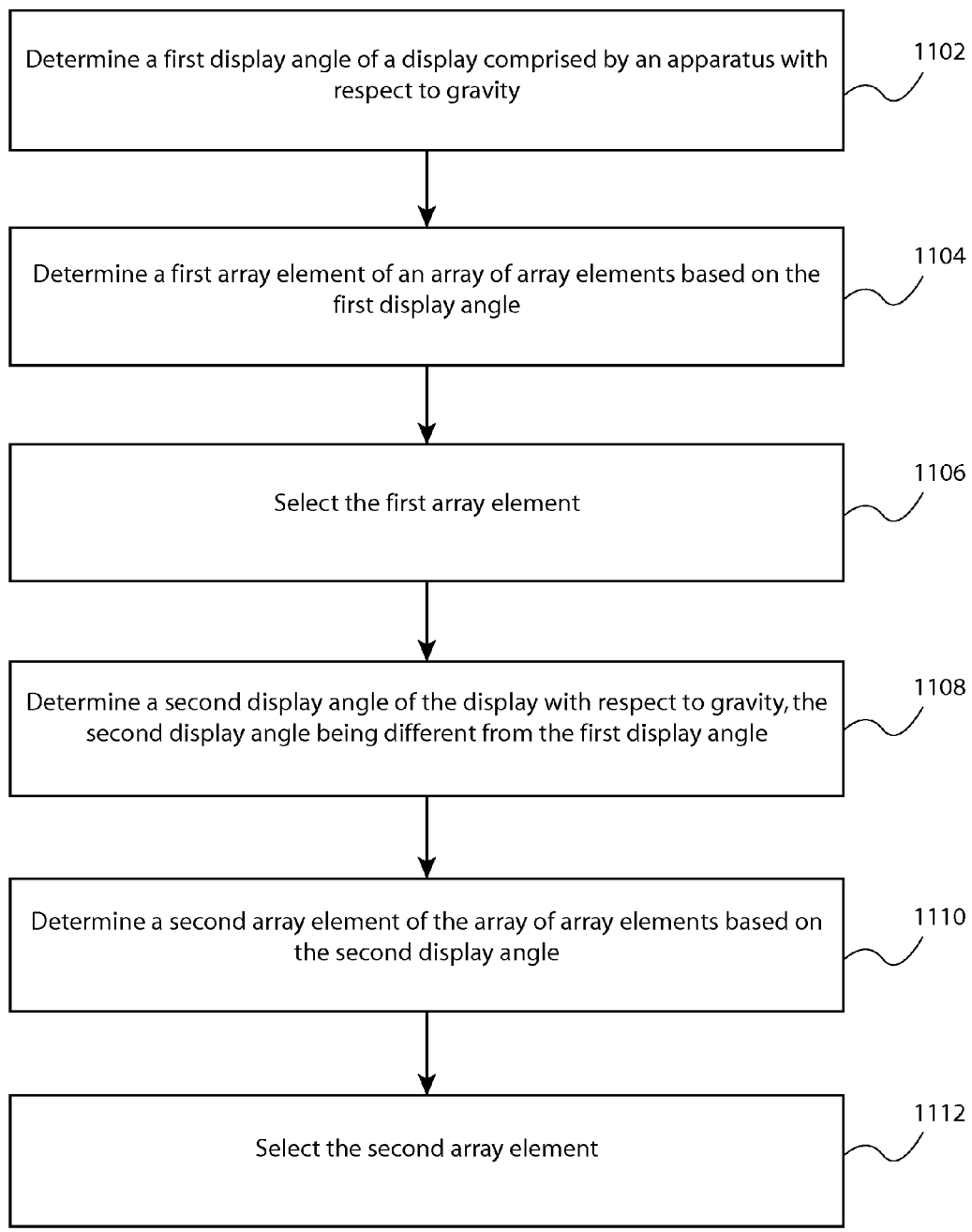
FIG. 11 is a flow diagram illustrating activities associated with determination of an array element of an array of array elements based, at least in part, on a display angle of a display according to at least one example embodiment.

FIG. 11 is a flow diagram illustrating activities associated with determination of an array element of an array of array elements based, at least in part, on a display angle of a display according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As discussed previously, in some circumstances, it may be desirable to select an array element of an array of array elements based, at least in part, on a display angle of a display.

At block 1102, the apparatus determines a first display angle of a display comprised by an apparatus with respect to gravity. The determination, the first display angle, the display, and the apparatus may be similar as described regarding FIGS. 2A-2F and FIGS. 3A-3C.

At block 1104, the apparatus determines a first array element of an array of array elements based, at least in part, on the first display angle. The determination, the first array element, and the array of array elements may be similar as described regarding FIGS. 3A-3C, FIGS. 4A-4C, and FIGS. 5A-5E.

At block 1106, the apparatus selects the first array element. The selection of the first array element may be similar as described regarding FIGS. 3A-3C, FIGS. 4A-4C, and FIGS. 5A-5E.

At block 1108, the apparatus determines a second display angle of the display with respect to gravity, the second display angle being different from the first display angle. The determination and the second display angle may be similar as described regarding FIGS. 2A-2F and FIGS. 3A-3C.

At block 1110, the apparatus determines a second array element of the array of array elements based, at least in part, on the second display angle. The determination and the second array element may be similar as described regarding FIGS. 3A-3C, FIGS. 4A-4C, and FIGS. 5A-5E.

At block 1112, the apparatus selects the second array element. The selection of the second array element may be similar as described regarding FIGS. 3A-3C, FIGS. 4A-4C, and FIGS. 5A-5E.

Figure 12:
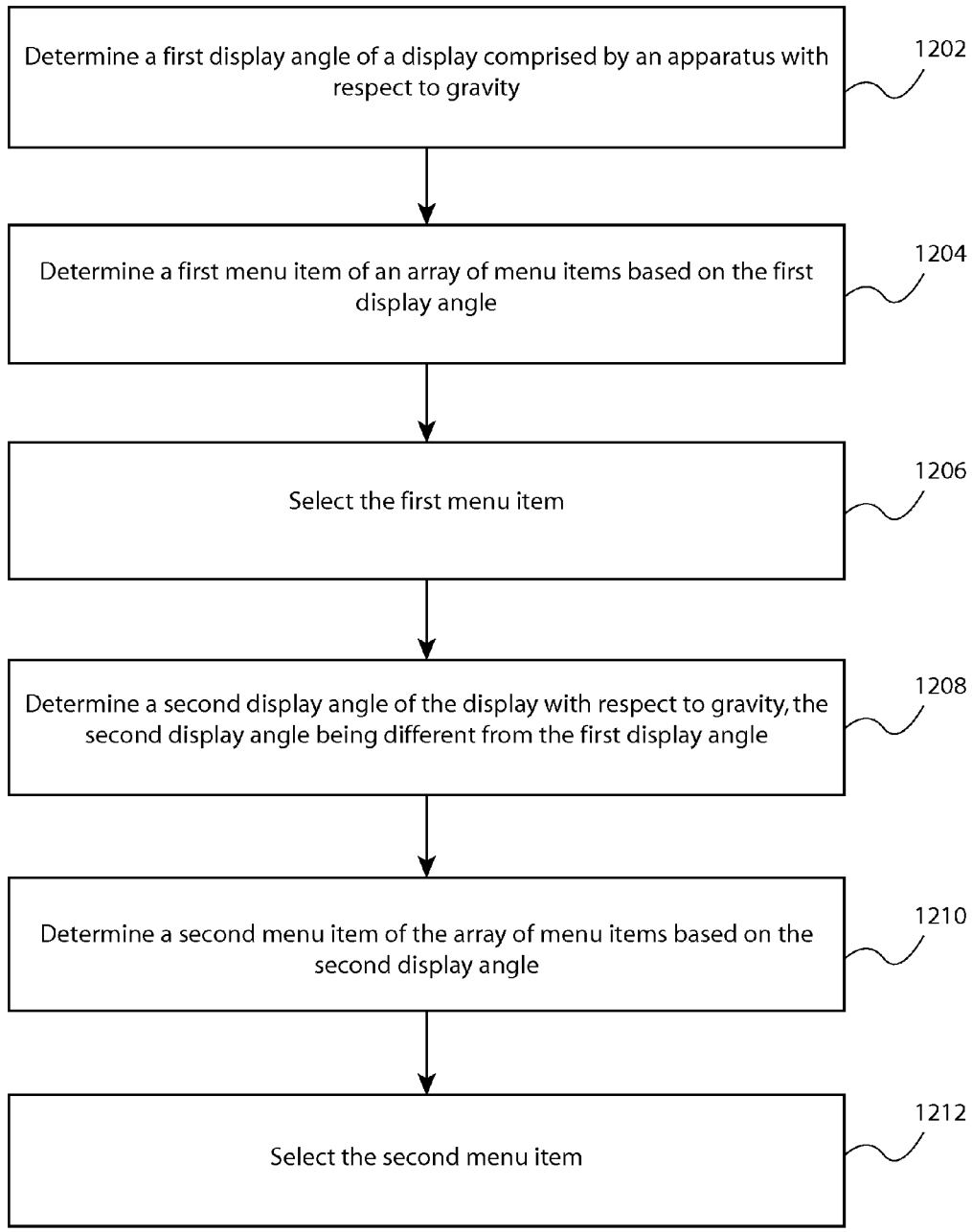
FIG. 12 is a flow diagram illustrating activities associated with determination of a menu item of an array of menu items based, at least in part, on a display angle of a display according to at least one example embodiment.

FIG. 12 is a flow diagram illustrating activities associated with determination of a menu item of an array of menu items based, at least in part, on a display angle of a display according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As discussed previously, in some circumstances, it may be desirable to select a menu item of an array of menu items based, at least in part, on a display angle of a display.

At block 1202, the apparatus determines a first display angle of a display comprised by an apparatus with respect to gravity. The determination, the first display angle, the display, and the apparatus may be similar as described regarding FIGS. 2A-2F and FIGS. 3A-3C.

At block 1204, the apparatus determines a first menu item of an array of menu items based, at least in part, on the first display angle. The determination, the first menu item, and the array of menu items may be similar as described regarding FIGS. 3A-3C and FIGS. 5A-5E.

At block 1206, the apparatus selects the first menu item. The selection of the first menu item may be similar as described regarding FIGS. 3A-3C and FIGS. 5A-5E.

At block 1208, the apparatus determines a second display angle of the display with respect to gravity, the second display angle being different from the first display angle. The determination and the second display angle may be similar as described regarding FIGS. 2A-2F and FIGS. 3A-3C.

At block 1210, the apparatus determines a second menu item of the array of menu items based, at least in part, on the second display angle. The determination and the second menu item may be similar as described regarding FIGS. 3A-3C and FIGS. 5A-5E.

At block 1212, the apparatus selects the second menu item. The selection of the second menu item may be similar as described regarding FIGS. 3A-3C and FIGS. 5A-5E.

Figure 13:
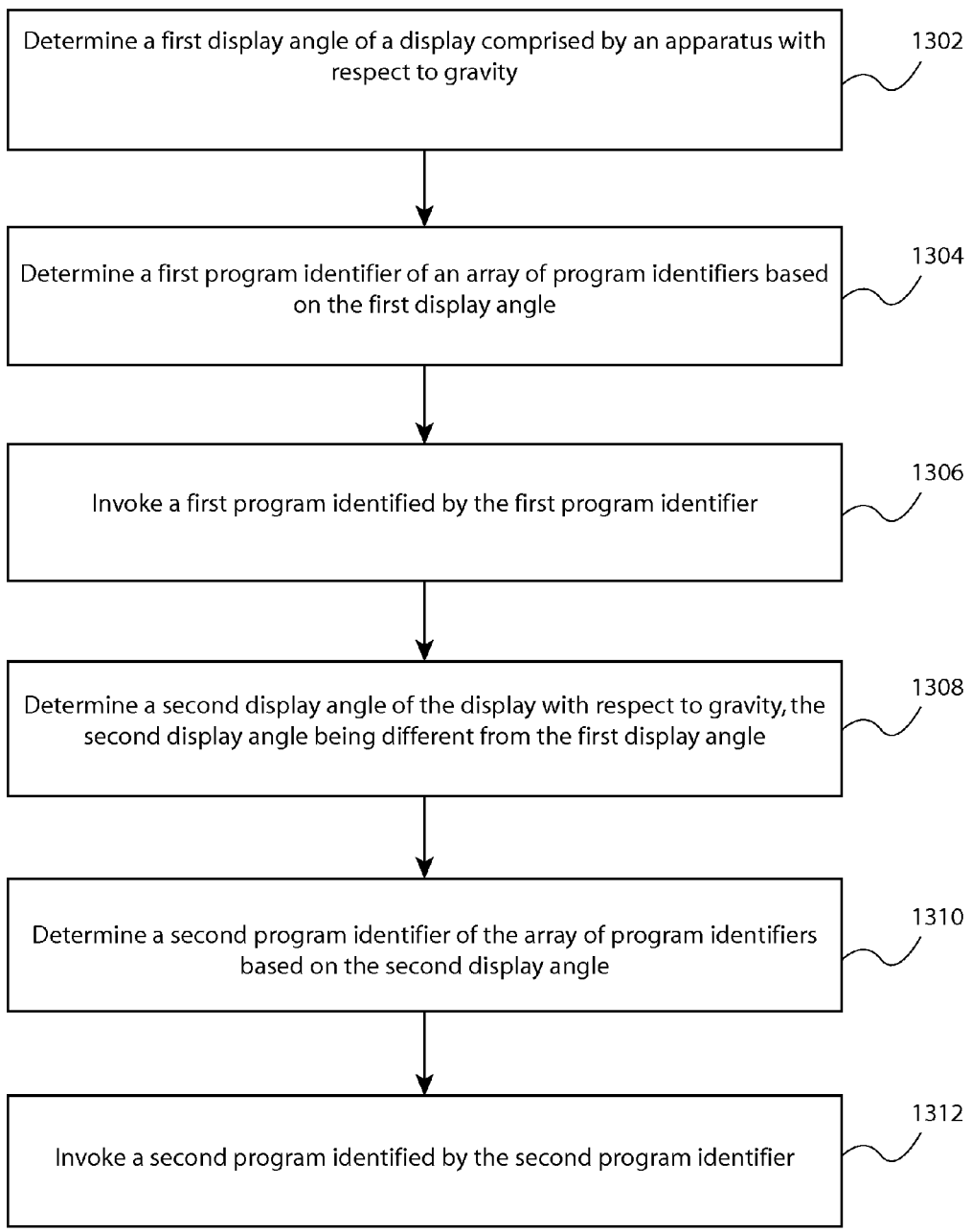
FIG. 13 is a flow diagram illustrating activities associated with determination of a program identifier of an array of program identifiers based, at least in part, on a display angle of a display according to at least one example embodiment.

FIG. 13 is a flow diagram illustrating activities associated with determination of a program identifier of an array of program identifiers based, at least in part, on a display angle of a display according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

As discussed previously, in some circumstances, it may be desirable to select a program identifier of an array of program identifiers based, at least in part, on a display angle of a display.

At block 1302, the apparatus determines a first display angle of a display comprised by an apparatus with respect to gravity. The determination, the first display angle, the display, and the apparatus may be similar as described regarding FIGS. 2A-2F and FIGS. 3A-3C.

At block 1304, the apparatus determines a first program identifier of an array of program identifiers based, at least in part, on the first display angle. The determination, the first program identifier, and the array of program identifiers may be similar as described regarding FIGS. 3A-3C and FIGS. 5A-5E.

At block 1306, the apparatus invokes a first program identified by the first program identifier. The invocation and the first program may be similar as described regarding FIGS. 3A-3C and FIGS. 5A-5E.

At block 1308, the apparatus determines a second display angle of the display with respect to gravity, the second display angle being different from the first display angle. The determination and the second display angle may be similar as described regarding FIGS. 2A-2F and FIGS. 3A-3C.

At block 1310, the apparatus determines a second program identifier of an array of program identifiers based, at least in part, on the second display angle. The determination and the second program identifier may be similar as described regarding FIGS. 3A-3C and FIGS. 5A-5E.

At block 1312, the apparatus invokes a second program identified by the second program identifier. The invocation and the second program may be similar as described regarding FIGS. 3A-3C and FIGS. 5A-5E.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 702, block 704, and block 706 of FIG. 7 may be performed after block 712 of FIG. 7. Furthermore, if desired, one or more of the above-described functions may be optional or may be combined. For example, block 912 and block 914 of FIG. 9 may be optional and/or combined with block 910 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus for controlling provision of different regions of sequential information, the apparatus comprising:
    at least one processor; and
    at least one memory including computer program code, the memory and the computer program code configured to, working with the processor, cause the apparatus to perform at least the following:
        determination of a first display angle of a display with respect to gravity, wherein the first display angle is associated with a first contiguous subset of the sequential information;
        in response to the determination of the first display angle, causing provision of the first contiguous subset of the sequential information such that the first contiguous subset is more visible than other sequential information;
        determination of a change from the first display angle to a second display angle of the display with respect to gravity, wherein the second display angle is associated with a second contiguous subset of the sequential information, wherein the second contiguous subset is identified based on having a sequential relationship to the first contiguous subset of the sequential information; and
        in response to the determination of the second display angle, changing the provision of information such that the second contiguous subset of the sequential information is more visible than the first contiguous subset of sequential information.

2. The apparatus of claim 1, wherein the determination of the second display angle comprises determination of an angular change between the first display angle and the second display angle, and determination of the second contiguous subset based, at least in part, on the angular change and the first contiguous subset.

3. The apparatus of claim 2, wherein the first contiguous subset corresponds with a first position within the displayed sequential information, and the second contiguous subset is based on a second position within the displayed sequential information, wherein the determination of the change from the first display angle and the second display angle is determined based, at least in part, on a magnitude of angular change between the first position and the second position.

4. The apparatus of claim 3, wherein the determination of the change from the first display angle and the second display angle is determined based, at least in part, on the direction of the angular change.

5. The apparatus of claim 1, wherein the displayed sequential information is a virtual screen of information, the first contiguous subset is a first region of the virtual screen, the second contiguous subset is a second region of the virtual screen, and provision of the second contiguous subset results in provision of the second region of the virtual screen on the display such that the second contiguous subset is more visible than the first contiguous subset.

6. The apparatus according to claim 1, wherein the memory and the computer program code are further configured to, working with the processor, cause the apparatus to perform at least the following:
    determination of a change from the second display angle to a third display angle of the display with respect to gravity, wherein the second display angle is associated with a third contiguous subset of the sequential information, wherein the third contiguous subset is identified based on having a sequential relationship to the first contiguous subset and the second contiguous subset of the sequential information; and
    in response to the determination of the third display angle, change the provision of the information such that the third contiguous subset of the sequential information is more visible than the first contiguous subset and the second contiguous subset of sequential information.

7. The apparatus according to claim 1, wherein a difference of positions of any two contiguous subsets identified is proportional to an associated angular change resulting in an associated change of the provision of the information.

8. The apparatus according to claim 1, wherein the displayed information remains in an upright orientation with respect to gravity whether the display is positioned in either the first display angle or the second display angle.

9. A method for controlling provision of information comprising different regions of sequential information, the method comprising:
    determining a first display angle of a display with respect to gravity, wherein the first display angle is associated with a first contiguous subset of the sequential information;
    in response to the determination of the first display angle, causing provision of the first contiguous subset of the sequential information such that the first contiguous subset is more visible than other sequential information;
    determining a change from the first display angle to a second display angle of the display with respect to gravity, wherein the second display angle is associated with a second contiguous subset of the sequential information, wherein the second contiguous subset is identified based on having a sequential relationship to the first contiguous subset of the sequential information; and
    in response to determining the second display angle, changing the provision of information such that the second contiguous subset of the sequential information is more visible than the first contiguous subset of sequential information.

10. The method of claim 9, wherein the determination of the second display angle comprises determining an angular change between the first display angle and the second display angle, and determining the second contiguous subset based, at least in part, on the angular change and the first contiguous subset.

11. The method of claim 10, wherein the first contiguous subset corresponds with a first position within the displayed sequential information, and the second contiguous subset is based on a second position within the displayed sequential information, wherein the determination of the change from the first display angle and the second display angle is determined based, at least in part, on a magnitude of angular change between the first position and the second position.

12. The method of claim 9, wherein the displayed sequential information is a virtual screen of information, the first contiguous subset is a first region of the virtual screen, the second contiguous subset is a second region of the virtual screen, and provision of the second contiguous subset results in provision of the second region of the virtual screen on the display such that the second contiguous subset is more visible than the first contiguous subset.

13. The method according to claim 9, further comprising:
   determining a change from the second display angle to a third display angle of the display with respect to gravity, wherein the second display angle is associated with a third contiguous subset of the sequential information, wherein the third contiguous subset is identified based on having a sequential relationship to the first contiguous subset and the second contiguous subset of the sequential information; and
   in response to the determination of the third display angle, changing the provision of the information such that the third contiguous subset of the sequential information is more visible than the first contiguous subset and the second contiguous subset of sequential information.

14. The method according to claim 9, wherein a difference of positions of any two contiguous subsets identified is proportional to an associated angular change resulting in an associated change of the provision of the information.

15. The method according to claim 9, wherein the displayed information remains in an upright orientation with respect to gravity whether the display is positioned in either the first display angle or the second display angle.

16. At least one non-transitory computer-readable medium for controlling provision of information comprising different regions of sequential information, the non-transitory computer-readable medium encoded with instructions that, when executed by a processor, perform:
   determination of a first display angle with respect to gravity of a display, wherein the first display angle is associated with a first contiguous subset of the sequential information;
   in response to the determination of the first display angle, causing provision of the first contiguous subset of the displayed sequential information such that the first contiguous subset is more visible than other sequential information;
   determination of a change from the first display angle to a second display angle of the display with respect to gravity, wherein the second display angle is associated with a second contiguous subset of the sequential information, wherein the second contiguous subset is identified based on having a sequential relationship to the first contiguous subset of the sequential information; and
   in response to the determination of the second display angle, changing the provision of information such that the second contiguous subset of the sequential information is more visible than the first contiguous subset of sequential information.

17. The at least one non-transitory computer-readable medium of claim 16, wherein the determination of the second display angle comprises determination of an angular change between the first display angle and the second display angle, and determination of the second contiguous subset based, at least in part, on the angular change and the first contiguous subset.

18. The at least one non-transitory computer-readable medium of claim 17, wherein the first contiguous subset corresponds with a first position within the displayed sequential information, and the second contiguous subset is based on a second position within the displayed sequential information, wherein the second position is determined based, at least in part, on a magnitude of angular change.

19. The at least one non-transitory computer-readable medium of claim 18, wherein the determination of the change from the first display angle and the second display angle is determined based, at least in part, on the direction of the angular change.

20. The at least one non-transitory computer-readable medium of claim 16, wherein the displayed sequential information is a virtual screen of information, the first contiguous subset is a first region of the virtual screen, the second contiguous subset is a second region of the virtual screen, and provision of the second contiguous subset results in provision of the second region of the virtual screen on the display such that the second contiguous subset is more visible than the first contiguous subset.

* * * * *